(12) United States Patent
Azimi et al.

(10) Patent No.: US 9,309,162 B2
(45) Date of Patent: Apr. 12, 2016

(54) LIQUID-ENCAPSULATED RARE-EARTH BASED CERAMIC SURFACES

(71) Applicant: Massachusetts Institute of Technology, Cambridge, MA (US)

(72) Inventors: Gisele Azimi, Waltham, MA (US);
Adam T. Paxson, Cambridge, MA (US);
J. David Smith, Boston, MA (US);
Kripa K. Varanasi, Lexington, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 0 days.

(21) Appl. No.: 13/741,898

(22) Filed: Jan. 15, 2013

(65) Prior Publication Data

US 2013/0251946 A1     Sep. 26, 2013

Related U.S. Application Data

(60) Provisional application No. 61/615,184, filed on Mar. 23, 2012.

(51) Int. Cl.
*C04B 41/81* (2006.01)
*B05D 5/00* (2006.01)

(52) U.S. Cl.
CPC . *C04B 41/81* (2013.01); *B05D 5/00* (2013.01); *Y10T 428/24364* (2015.01); *Y10T 428/3154* (2015.04); *Y10T 428/31544* (2015.04); *Y10T 428/31663* (2015.04); *Y10T 428/31678* (2015.04); *Y10T 428/31844* (2015.04)

(58) Field of Classification Search
None
See application file for complete search history.

(56) References Cited

U.S. PATENT DOCUMENTS

| | | | |
|---|---|---|---|
| 4,069,933 A | 1/1978 | Newing | |
| 4,125,152 A | 11/1978 | Kestner et al. | |
| 4,204,021 A | 5/1980 | Becker | |
| 4,316,745 A | 2/1982 | Blount | |
| 4,503,099 A | 3/1985 | Chang et al. | |
| 5,083,606 A | 1/1992 | Brown et al. | |
| 5,154,741 A | 10/1992 | da Costa Filho | |
| 5,624,713 A | 4/1997 | Ramer | |

(Continued)

FOREIGN PATENT DOCUMENTS

| | | |
|---|---|---|
| CN | 100344341 C | 10/2007 |
| CN | 101269960 B | 5/2011 |

(Continued)

OTHER PUBLICATIONS

Allain et al., A New Method for Contact-Angle Measurements of Sessile Drops, Journal of Calloid and Interface Science, vol. 107, No. 1, Sep. 1985, 9 pages.

(Continued)

*Primary Examiner* — David Sample
*Assistant Examiner* — Donald M Flores, Jr.
(74) *Attorney, Agent, or Firm* — Choate, Hall & Stewart LLP; William R. Haulbrook; Alexander D. Augst

(57) ABSTRACT

Described herein are non-wetting surfaces comprising rare-earth containing ceramics. Furthermore, the surfaces include liquid impregnated within a matrix of micro- or nano-engineered features on the surface. The surfaces are non-wetting and can resist liquid impalement, ice formation, scale formation, hydrate formation, and/or have antifouling properties.

21 Claims, 8 Drawing Sheets

(56) References Cited

U.S. PATENT DOCUMENTS

| | | | |
|---|---|---|---|
| 5,816,280 | A | 10/1998 | Rojey et al. |
| 5,817,898 | A | 10/1998 | Delion et al. |
| 5,853,802 | A | 12/1998 | Boyer et al. |
| 5,900,516 | A | 5/1999 | Talley et al. |
| 5,936,040 | A | 8/1999 | Costello et al. |
| 6,028,234 | A | 2/2000 | Heinemann et al. |
| 6,093,862 | A | 7/2000 | Sinquin et al. |
| 6,216,472 | B1 | 4/2001 | Cathenaut et al. |
| 6,329,490 | B1 | 12/2001 | Yamashita et al. |
| 6,389,820 | B1 | 5/2002 | Rogers et al. |
| 7,041,363 | B2 | 5/2006 | Krohmer et al. |
| 7,323,221 | B2 | 1/2008 | Heppekausen et al. |
| 7,458,384 | B1 | 12/2008 | Seal et al. |
| 7,597,148 | B2 | 10/2009 | O'Malley et al. |
| 7,622,197 | B2 | 11/2009 | Balow et al. |
| 7,687,593 | B2 | 3/2010 | Yamahiro et al. |
| 7,722,951 | B2 * | 5/2010 | Li et al. ............... 428/379 |
| 7,887,934 | B2 | 2/2011 | Gentleman et al. |
| 7,892,660 | B2 | 2/2011 | Gentleman et al. |
| 7,897,271 | B2 | 3/2011 | Gentleman et al. |
| 7,901,798 | B2 | 3/2011 | Gentleman et al. |
| 7,977,267 | B2 | 7/2011 | Gentleman et al. |
| 7,985,451 | B2 | 7/2011 | Luzinov et al. |
| 8,057,922 | B2 | 11/2011 | Gentleman et al. |
| 8,057,923 | B2 | 11/2011 | Gentleman et al. |
| 8,062,775 | B2 | 11/2011 | Gentleman et al. |
| 8,173,279 | B2 | 5/2012 | Gentleman et al. |
| 8,178,219 | B2 | 5/2012 | Gentleman et al. |
| 8,222,172 | B2 | 7/2012 | Gentleman et al. |
| 8,235,096 | B1 | 8/2012 | Mahefkey et al. |
| 8,236,432 | B2 | 8/2012 | Gentleman et al. |
| 8,252,259 | B2 | 8/2012 | Seal et al. |
| 8,574,704 | B2 | 11/2013 | Smith et al. |
| 2002/0164443 | A1* | 11/2002 | Oles et al. ............... 428/35.7 |
| 2003/0017303 | A1 | 1/2003 | Shindo et al. |
| 2003/0096083 | A1 | 5/2003 | Morgan et al. |
| 2003/0134035 | A1 | 7/2003 | Lamb et al. |
| 2003/0203117 | A1* | 10/2003 | Bartkowiak et al. ......... 427/421 |
| 2003/0226806 | A1 | 12/2003 | Young et al. |
| 2004/0026832 | A1 | 2/2004 | Gier et al. |
| 2004/0037961 | A1 | 2/2004 | Dieleman et al. |
| 2004/0219373 | A1 | 11/2004 | Deruelle et al. |
| 2004/0243249 | A1 | 12/2004 | Ishihara et al. |
| 2005/0003146 | A1 | 1/2005 | Spath |
| 2005/0009953 | A1 | 1/2005 | Shea |
| 2005/0016489 | A1 | 1/2005 | Endicott et al. |
| 2005/0061221 | A1 | 3/2005 | Paszkowski |
| 2005/0112326 | A1 | 5/2005 | Nun et al. |
| 2005/0136217 | A1 | 6/2005 | Barthlott et al. |
| 2005/0208272 | A1 | 9/2005 | Groll |
| 2006/0013735 | A1 | 1/2006 | Engelking et al. |
| 2006/0078724 | A1 | 4/2006 | Bhushan et al. |
| 2006/0147675 | A1 | 7/2006 | Nun et al. |
| 2006/0204738 | A1 | 9/2006 | Dubrow et al. |
| 2006/0240218 | A1 | 10/2006 | Parce |
| 2006/0246226 | A1 | 11/2006 | Dai et al. |
| 2007/0026193 | A1 | 2/2007 | Luzinov et al. |
| 2007/0031639 | A1 | 2/2007 | Hsu et al. |
| 2007/0135602 | A1 | 6/2007 | Yamahiro et al. |
| 2007/0207335 | A1 | 9/2007 | Karandikar et al. |
| 2007/0231542 | A1* | 10/2007 | Deng et al. ............... 428/141 |
| 2007/0282247 | A1 | 12/2007 | Desai et al. |
| 2007/0298216 | A1 | 12/2007 | Jing et al. |
| 2008/0085070 | A1 | 4/2008 | Hirata et al. |
| 2008/0118763 | A1 | 5/2008 | Balow et al. |
| 2008/0213461 | A1 | 9/2008 | Gill et al. |
| 2008/0225378 | A1 | 9/2008 | Weikert et al. |
| 2009/0124520 | A1 | 5/2009 | Tohidi |
| 2009/0155609 | A1 | 6/2009 | Gentleman et al. |
| 2009/0185867 | A1 | 7/2009 | Masters et al. |
| 2009/0211735 | A1 | 8/2009 | Stenkamp et al. |
| 2009/0231273 | A1 | 9/2009 | Lashina et al. |
| 2010/0028604 | A1 | 2/2010 | Bhushan et al. |
| 2010/0092621 | A1 | 4/2010 | Akutsu et al. |
| 2010/0098909 | A1 | 4/2010 | Reyssat et al. |
| 2010/0112286 | A1 | 5/2010 | Bahadur et al. |
| 2010/0143620 | A1 | 6/2010 | Ajdelsztajn et al. |
| 2010/0147441 | A1 | 6/2010 | Nakagawa et al. |
| 2010/0180952 | A1 | 7/2010 | Verhelst et al. |
| 2010/0200094 | A1 | 8/2010 | Ermakov |
| 2010/0218517 | A1 | 9/2010 | Luther |
| 2010/0285229 | A1 | 11/2010 | Elbahri et al. |
| 2010/0285275 | A1 | 11/2010 | Baca et al. |
| 2010/0307922 | A1 | 12/2010 | Wu |
| 2010/0330146 | A1 | 12/2010 | Chauhan et al. |
| 2011/0042850 | A1 | 2/2011 | Hong et al. |
| 2011/0077172 | A1 | 3/2011 | Aizenberg et al. |
| 2011/0106504 | A1 | 5/2011 | Noureldin |
| 2011/0201984 | A1 | 8/2011 | Dubrow et al. |
| 2011/0226998 | A1 | 9/2011 | Van De Weijer-Wagemans et al. |
| 2011/0283778 | A1* | 11/2011 | Angelescu et al. ......... 428/315.5 |
| 2011/0287217 | A1 | 11/2011 | Mazumder et al. |
| 2012/0036846 | A1 | 2/2012 | Aizenberg et al. |
| 2012/0128963 | A1 | 5/2012 | Mao et al. |
| 2013/0003258 | A1 | 1/2013 | Xie et al. |
| 2013/0032316 | A1 | 2/2013 | Dhiman et al. |
| 2013/0034695 | A1 | 2/2013 | Smith et al. |
| 2013/0062285 | A1 | 3/2013 | Hoek et al. |
| 2013/0146536 | A1 | 6/2013 | Tarabara et al. |
| 2013/0220813 | A1 | 8/2013 | Anand et al. |
| 2013/0251769 | A1 | 9/2013 | Smith et al. |
| 2013/0251942 | A1* | 9/2013 | Azimi et al. ............... 428/141 |
| 2013/0251946 | A1 | 9/2013 | Azimi et al. |
| 2013/0251952 | A1 | 9/2013 | Smith et al. |
| 2013/0333789 | A1 | 12/2013 | Smith et al. |
| 2013/0335697 | A1 | 12/2013 | Smith et al. |
| 2013/0337027 | A1 | 12/2013 | Smith et al. |
| 2014/0147627 | A1 | 5/2014 | Aizenberg et al. |
| 2014/0291420 | A1 | 10/2014 | Dhiman et al. |
| 2015/0111063 | A1 | 4/2015 | Khan et al. |
| 2015/0125575 | A1 | 5/2015 | Smith et al. |

FOREIGN PATENT DOCUMENTS

| | | |
|---|---|---|
| DE | 198 18 956 A1 | 11/1998 |
| EP | 0230112 A2 | 7/1987 |
| EP | 1892458 A1 | 2/2008 |
| JP | 1 170932 A | 7/1989 |
| JP | 5 240251 A | 9/1993 |
| JP | 2004 037764 A | 2/2004 |
| JP | 2007-278090 A | 10/2007 |
| JP | 2008-223003 A | 9/2008 |
| JP | 2008240910 A | 10/2008 |
| TW | 1 233 968 B | 6/2005 |
| WO | WO-93/17077 A1 | 9/1993 |
| WO | WO-99/36490 A1 | 7/1999 |
| WO | WO-02/062568 A2 | 8/2002 |
| WO | WO-03/071275 A1 | 8/2003 |
| WO | WO-2006/017009 A2 | 2/2006 |
| WO | WO-2006/091235 A1 | 8/2006 |
| WO | WO-2006/132892 A2 | 12/2006 |
| WO | WO-2007/019362 A1 | 2/2007 |
| WO | WO-2008/111603 A1 | 9/2008 |
| WO | WO-2009/009185 A2 | 1/2009 |
| WO | WO-2010/028752 A1 | 3/2010 |
| WO | WO-2010/082710 A1 | 7/2010 |
| WO | WO-2010/096073 A1 | 8/2010 |
| WO | WO-2010/129807 A1 | 11/2010 |
| WO | WO-2011/087458 A1 | 7/2011 |
| WO | WO-2011/143371 A1 | 11/2011 |
| WO | WO-2012/024099 A1 | 2/2012 |
| WO | WO-2012/100099 A2 | 7/2012 |
| WO | WO-2012/100100 A2 | 7/2012 |
| WO | WO-2013/022467 A2 | 2/2013 |
| WO | WO-2013/130118 A1 | 9/2013 |
| WO | WO-2013/141888 A1 | 9/2013 |
| WO | WO-2013/141953 A2 | 9/2013 |

OTHER PUBLICATIONS

Anand et al., Enhanced Condensation on Lubricant-Impregnated Nanotextured Surfaces. ACS Nano, 6(11):10122-10129 (2012).

Antonini et al., Water Drops Dancing on Ice: How Sublimation Leads to Drop Rebound, PRL 111, 014501 (2013).

(56) References Cited

OTHER PUBLICATIONS

Arkles, Hydrophobicity, Hydrophilicity and Silanes, Paint and Coatings Industry, Oct. 1, 2006, 10 pages.
Ashkin et al., Optical levitation by radiation pressure. Applied Physics Letters, 19(8):283-285 (1971).
Ashkin et al., Optical levitation of liquid drops by radiation pressure. Science, 187(4181):1073-1075 (1975).
Avedisian et al., Leidenfrost boiling of methanol droplets on hot porous/ceramic surfaces. International Journal of Heat and Mass Transfer, 30(2):379-393 (1987).
Baier et al., Propulsion Mechanisms for Leidenfrost Solids on Ratchet Surfaces. arXiv preprint arXiv:1208.5721 (2012).
Baier et al., Propulsion mechanisms for Leidenfrost solids on ratchets. Physical Review E—Statistical, Nonlinear, and Soft Matter Physics, 87(2) (2013).
Barnes, Geoff T., The Potential for Monolayers to Reduce the Evaporation of Water From Large Water Storages, Agricultural Water Management 95, 4:339-353, (2008).
Bauer et al., The insect-trapping rim of Nepenthes pitchers: surface structure and function, Plant Signaling & Behavior, 4 (11): 1019-1023 (2009).
Beaugnon et al., Dynamics of magnetically levitated droplets. Physica B: Condensed Matter, 294-295:715-720 (2001).
Biance et al., Leidenfrost drops. Physics of Fluids, 15(6):1632-1637 (2003).
Bico et al., Pearl drops. Europhysics Letters, 47(2):220-226 (1999).
Blossey, R., Self-cleaning surfaces—Virtual realities. Nature Materials, 2(5):301-306 (2003).
Bohn et al., Insect aquaplaning: Nepenthes pitcher plants capture prey with the peristome, a fully wettable water-lubricated anisotropic surface, Proceedings of the National Academy of Sciences,14138-14143 (2004).
Burton, et al., Geometry of the Vapor Layer Under a Leidenfrost Drop. Physical Review Letters, 109(7):074301 (2012).
Cao et al., Anti-Icing Superhydrophobic Coatings, Langmuir Letter, 2009, A-E.
Cassie et al., Wettability of porous surfaces, Transactions of the Faraday Society, 40: 546-551, (1944).
Celestini, et al., Take Off of Small Leidenfrost Droplets. Physical Review Letters, 109(3):034501 (2012).
Chandra et al., Leidenfrost evaporation of liquid nitrogen droplets. Transactions—ASME: Journal of Heat Transfer, 116(4):999-1006 (1994).
Chandra et al., Observations of droplet impingement on a ceramic porous surface. International Journal of Heat and Mass Transfer 35(10):2377-2388 (1992).
Chen et al., A Wettability Switchable Surface by Microscale Surface Morphology Change, Journal of Micromechanics & Microengineering, Institute of Physics Publishing, 17(3): 489-195 (2007).
Cummings et al., Oscillations of magnetically levitated aspherical droplets. Journal of Fluid Mechanics, 224:395-416 (1991).
Deng et al., Nonwetting of impinging droplets on textured surfaces. Applied Physics Letters, 94(13) 133109 1-3 (2009).
Elbahri et al., Anti-lotus effect for nanostructuring at the leidenfrost temperature. Advanced Materials, 19(9):1262-1266 (2007).
Feng et al., Design and creation of superwetting/antiwetting surfaces. Advanced Materials, 18(23):3063-3078 (2006).
Fondecave, R. and Wyart, F.B., Polymers as Dewetting Agents, Marcomolecules 31:9305-9315 (1998).
Fujimoto et al., Deformation and rebounding processes of a water droplet impinging on a flat surface above Leidenfrost temperature. Journal of Fluids Engineering, Transactions of the ASME, 118(1):142-149 (1996).
Furmidge, Studies at Phase Interfaces, Journal of Colloid Science, 1962, 17: 309-324.
Gao et al., Artificial lotus leaf prepared using a 1945 patent and a commercial textile. Langmuir, 22(14):5998-6000 (2006).
Goldshtik et al., A liquid drop on an air cushion as an analogue of Leidenfrost boiling. Journal of Fluid Mechanics, 166:1-20 (1986).
Gradeck et al., Heat transfer for Leidenfrost drops bouncing onto a hot surface. Experimental Thermal and Fluid Science, 47:14-25 (2013).
Hashmi et al., Leidenfrost levitation: Beyond droplets. Scientific Reports, 2:797:1-4 (2012).
Hejazi et al., Wetting Transitions in Two-, Three-, and Four-Phase Systems, Langmuir, 28:2173-2180 (2012).
Holden et al., The Use of Organic Coatings to Promote Dropwise Condensation of Steam, Journal of Heat Transfer, 109: 768-774 (1987).
International Preliminary Report on Patentability, PCT/US2011/061498, Feb. 13, 2014, 12 pages.
International Search Report and Written Opinion for PCT/US2011/061498, dated Jul. 31, 2012, 17 pages.
International Search Report, PCT/US2011/061898, Apr. 24, 2013, 6 pages.
International Search Report, PCT/US2012/030370, Oct. 15, 2012, 6 pages.
International Search Report, PCT/US2012/042326, Dec. 3, 2012, 4 pages.
International Search Report, PCT/US2012/042327, May 16, 2013, 6 pages.
International Search Report, PCT/US2013/021558, Oct. 11, 2013, 5 pages.
International Search Report, PCT/US2013/028439, Dec. 5, 2013, 6 pages.
International Search Report, PCT/US2013/042771, May 26, 2014, 4 pages.
International Search Report, PCT/US2013/045731, Nov. 12, 2013, 3 pages.
International Search Report, PCT/US2013/070827, Mar. 27, 2014, 7 pages.
Iwasa, et al., 'Electromaglev'—Magnetic levitation of a superconducting disc with a DC field generated by electromagnets: Part 1. Theoretical and experimental results on operating modes, lift-to-weight ratio, and suspension stiffness. Cryogenics, 37(12):807-816, (1997).
Jung et al., Are Superhydrophobic Surfaces Best for Icephobicity? Langmuir, 27(6):3059-3066 (2011).
Kim et al., Hierarchical or not? Effect of the length scale and hierarchy of the surface roughness on omniphobicity of lubricant-infused substrates. Nano Letters, 13(4):1793-1799 (2013).
Kim et al., Levitation Time Measurement of Water Drops on the Surface of Liquid Nitrogen, Journal of the Korean Physical Society, vol. 58, No. 6, pp. 1628-1632 (Jun. 2011).
Kim, Heetae, Floating Phenomenon of a Water Drop on the Surface of Liquid Nitrogen, Journal of the Korean Physical Society, vol. 49, No. 4, pp. L1335-L1338 (Oct. 2006).
Kulinich et al., Ice Adhesion on Super-Hydrophobic Surfaces, Applied Surface Science, 2009, 225: 8153-8157.
Lafuma, A. et al., Slippery Pre-Suffused Surfaces; EPL, 96: 56001-p1-56001-p4 (2011).
Lagubeau et al., Leidenfrost on a ratchet. Nature Physics, 7(5):395-398 (2011).
Lee et al., Dynamic Wetting and Spreading Characteristics of a Liquid Droplet Impinging on Hydrophobic Textured Surfaces, Langmuir, (2011), 27, 6565-6573.
Leidenfrost, J. G., On the fixation of water in diverse fire. International Journal of Heat and Mass Transfer, 9(11):1153-1166 (1966).
Li et al., Dynamic Behavior of the Water Droplet Impact on a Textured Hydrophobic/Superhydrophobic Surface: The Effect of the Remaining Liquid Film Arising on the Pillars' Tops on the Contact Time, Langmuir, (2010), 26(7), 4831-4838.
Linke et al., Self-propelled leidenfrost droplets. Physical Review Letters, 96(15) (2006).
Liu et al., Metallic Surfaces with Special Wettability, Nanoscale, 3:825-238 (2011).
Marin et al., Capillary droplets on Leidenfrost micro-ratchets. arXiv preprint arXiv:1210.4978 (2012).
Meuler et al., Exploiting Topographical Texture to Impact Icephobicity, ACS Nano, 2010, 4(12): 7048-7052.
Mills, A. A., Pillow lavas and the Leidenfrost effect. Journal of the Geological Society, 141(1):183-186 (1984).

(56) References Cited

OTHER PUBLICATIONS

Mishchenko et al., Design of ice-free nanostructured surfaces based on repulsion of impacting water droplets. ACS Nano, 4(12):7699-7707 (2010).
Onda et al., Super-water-repellent fractal surfaces. Langmuir, 12(9) (1996).
Ou et al., Laminar drag reduction in microchannels using ultrahydrophobic surfaces. Physics of Fluids, 16(12):4635-4643 (2004).
Park et al., A Numerical Study of the Effects of Superhydrophobic Surface on Skin-Friction Drag in Turbulent Channel Flow, Phys. Fluids 25, 110815 (2013).
Piroird et al., Magnetic control of Leidenfrost drops. Physical Review E—Statistical, Nonlinear, and Soft Matter Physics, 85(5) (2012).
Pozzato et al., Superhydrophobic surfaces fabricated by nanoimprint lithography, Microelectronic Engineering, 83, (2006), 884-888.
Prat et al., On the effect of surface roughness on the vapor flow under Leidenfrost-Levitated droplets. Journal of Fluids Engineering, Transactions of the ASME, 117(3):519-525 (1995).
Quéré et al., Surfing the hot spot. Nature Materials, 5(6):429-430 (2006).
Quéré, D., Leidenfrost dynamics, Annu. Rev. Fluid Mech., 197-215 (2013).
Quéré, D., Non-sticking drops, Institute of Physics Publishing, Rep. Prog. Phys., 68(11):2495-2532 (2005).
Rausch et al., On the Characteristics of Ion Implanted Metallic Surfaces Inducing Dropwise Condensation of Steam, Langmuir, 26(8): 5971-5975 (2010).
Reyssat et al., Dynamical superhydrophobicity. Faraday Discussions, 146:19-33 (2010).
Reyssat, et al., Bouncing transitions on microtextured materials. Europhysics Letters, 74(2):306-312 (2006).
Richard, D. et al., Contact time of a bouncing drop, Nature 417:(6891):811 (2002).
Roosen et al., Optical levitation by means of two horizontal laser beams: a theoretical and experimental study. Physics Letters A, 59(1):6-8 (1976).
Rothstein, J. P., Slip on superhydrophobic surfaces, ANRV400-FL42-05, ARI, 89-109 (2010).
Rykaczewski et al., Mechanism of Frost Formation of Lubricant-Impregnated Surfaces, Langmuir 2013, 29 5230-5238, 13 pages.
Seiwert et al., Coating of a Textured Solid, J. Fluid Mech., 2011, 669: 55-63.
Sekeroglu et al., Transport of a soft cargo on a nanoscale ratchet. Applied Physics Letters, 99(6) (2011).
Smith et al., Droplet Mobility on Lubricant-Impregnated Surfaces, Soft Matter, 2012(9): 1772-1780 (2012).
Smith et al., Liquid-encapsulating surfaces: overcoming the limitations of superhydrophobic surfaces for robust non-wetting and anti-icing surfaces. in Bulletin of the American Physical Society (2011) Abstract Only.
Snoeijer et al., Maximum size of drops levitated by an air cushion. Physical Review E—Statistical, Nonlinear, and Soft Matter Physics, 79(3) (2009).
Song et al., Superhydrophobic Surfaces Produced by Applying a Self-Assembled Monolayer to Silicon Micro/Nano-Textured Surfaces, Nano Research, 2009, 2: 143-150.
Song et al., Vitrification and levitation of a liquid droplet on liquid nitrogen, PNAS Early Edition, pp. 1-5 (2010).
Trinh et al., The dynamics of ultrasonically levitated drops in an electric field. Physics of Fluids, 8(1):43-61 (1996).
Tuteja et al., Designing superoleophobic surfaces. Science, 318(5856):1618-1622 (2007).
Tuteja et al., Robust omniphobic surfaces. Proceedings of the National Academy of Sciences of the United States of America, 105(47):18200-18205 (2008).
Vakarelski et al., Drag reduction by leidenfrost vapor layers. Physical Review Letters, 106(21) (2011).
Vakarelski et al., Stabilization of Leidenfrost vapour layer by textured superhydrophobic surfaces. Nature, 489(7415):274-277 (2012).
Varanasi et al., Frost formation and ice adhesion on superhydrophobic surfaces. Applied Physics Letters, 97(23) (2010).
Varanasi et al., Spatial Control in the Heterogeneous Nucleation of Water, Applied Physics Letters, 95: 094101-01-03 (2009).
Weber et al., Aero-acoustic levitation: A method for containerless liquid-phase processing at high temperatures. Review of Scientific Instruments, 65(2):456-465 (1994).
Weickgenannt et al., Inverse-Leidenfrost phenomenon on nanofiber mats on hot surfaces. Physical Review E—Statistical, Nonlinear, and Soft Matter Physics, 84(3) (2011).
Weilert et al., Magnetic levitation and noncoalescence of liquid helium. Physical Review Letters, 77(23):4840-4843 (1996).
Welter et al., Acoustically levitated droplets—A new tool for micro and trace analysis. Fresenius' Journal of Analytical Chemistry, 357(3):345-350 (1997).
Wenzel, Resistance of Solid Surfaces to Wetting by Water, Industrial & Engineering Chemistry, 28(8): 988-994 (1936).
Wong et al., Bioinspired Self-Repairing Slippery Surfaces with Pressure-Stable Omniphobicity, Nature, 477(7365):443-447 (2011).
Written Opinion, PCT/US2011/061898, Apr. 24, 2013, 9 pages.
Written Opinion, PCT/US2012/030370, Oct. 15, 2012, 10 pages.
Written Opinion, PCT/US2012/042326, Dec. 3, 2012, 7 pages.
Written Opinion, PCT/US2012/042327, May 16, 2013, 6 pages.
Written Opinion, PCT/US2013/021558, Oct. 11, 2013, 7 pages.
Written Opinion, PCT/US2013/028439, Dec. 5, 2013, 11 pages.
Written Opinion, PCT/US2013/042771, May 26, 2014, 7 pages.
Written Opinion, PCT/US2013/045731, Nov. 12, 2013, 3 pages.
Written Opinion, PCT/US2013/070827, Mar. 27, 2014, 15 pages.
Würger, A., Leidenfrost gas ratchets driven by thermal creep. Physical Review Letters, 107(16) (2011).
Yarin et al., On the acoustic levitation of droplets. Journal of Fluid Mechanics, 356:65-91 (1998).
Yasuda et al., Levitation of metallic melt by using the simultaneous imposition of the alternating and the static magnetic fields. Journal of Crystal Growth, 260(3-4):475-485 (2004).
Yu et al., Containerless solidification of oxide material using an electrostatic levitation furnace in microgravity. Journal of Crystal Growth, 231(4):568-576 (2001).
Zhao et al., Dropwise condensation of Steam on Ion Implanted Condenser Surfaces, Heat Recovery Systems & CHP, 14(5): 525-534 (1994).
3M Corporation, Fluorinert Liquids for Electronics Manufacturing, 3M Electronic Materials 2003, pp. 1-4.
Azimi, G. et al., Hydrophobicity of rare-earth oxide ceramics, Nature Materials, DOI:10.1038/NMAT3545, (2013).
Bargir, S. et al., The use of contact angle measurements to estimate the adhesion propensity of calcium carbonate to solid substrates in water, Applied Surface Science 255:4873-4879 (2009).
Betz, A. R. et al., Do surfaces with mixed hydrophilic and hydrophobic areas enhance pool boiling?, Applied Physics Letters, 97:141909 p. 1-3, (2010).
Bird, J. C. et al, Reducing the contact time of a bouncing drop, Nature, 503:385 (2013).
Chaudhuri et al., Dynamic Contact Angles on PTFE Surface by Aqueous Surfactant Solution in Absence and Presence of Electrolytes, Journal of Colloid and Interface Science, 337:555-562 (2009).
Eck, S. et al., Growth and thermal properties of ultrathin cerium oxide layers on Rh(111), Surface Science, 520:173-185, (2002).
Good, Robert J., Contact angle, wetting and adhesion: a critical review, J. Adhesion Sci. Technol. vol. 6, No. 12, pp. 1269-1302 (1992).
Grace, J., Energy From Gas Hydrates: Assessing the Opportunities and Challenges for Canada, Council of Canadian Academies, Jul. 2008, 8 pages.
International Preliminary Report on Patentability for PCT/US2011/049187, dated Mar. 7, 2013, 8 pages.
International Search Report for PCT/US2012/065627, dated Mar. 8, 2013, 3 pages.

(56) References Cited

OTHER PUBLICATIONS

International Search Report, PCT/US2011/049187, Jan. 23, 2013, 4 pages.
Kazi et al., Mineral Scale Formation and Mitigation on Metals and a Polymeric Heat Exchanger Surface, Applied Thermal Engineering, 30:2236-2242 (2010).
Marcus, Y., Ions in Water and Biophysical Implications from Chaos to Cosmos, Surfaces Between Water and Another Liquid, Springer, p. 147, Table 4.1 (2012).
Matolin, V. et al., Growth of ultra-thin cerium oxide layers on Cu(111), Surface Science 254:153-155, (2007).
Mullins, D. R. et al., Ordered cerium oxide thin films gown on Ru(0001) and Ni(111), Surface Science, 429:186-198, (1999).
Santos et al., Modified Stainless Steel Surfaces Targeted to Reduce Fouling, J. Food Engineering, 64:63-79 (2004).
Schierbaum, Klaus-Dieter, Ordered ultra-thin cerium oxide overlayers on Pt(111) single crystal surfaces studied by LEED and XPS, Surface Science, 399:29-38, (1998).
Sloan, Jr., E. Dendy, Fundamental Principles and Applications of Natural Gas Hydrates, Nature Publishing Group, 353-359 (2003), 7 pages.
Sum, Amadeu K. et al, Clathrate Hydrates: From Laboratory Science to Engineering Practice, American Chemical Society, Ind. Eng. Chem. Res., vol. 48, No. 16, pp. 7457-7465, Jul. 22, 2009, 9 pages.
Sutara, F. et al., Epitaxial growth of continuous $CeO_2$(111) ultra-thin films on Cu(111), Thin Solid Films, 516:6120-6124 (2008).
Tropmann et al., Completely Superhydrophobic PDMS Surfaces for Microfluidics, Langmuir, ACS Publications (2012).
Written Opinion for PCT/US2011/049187, dated Jan. 23, 2013, 7 pages.
Written Opinion for PCT/US2012/065627, dated Mar. 8, 2013, 10 pages.

* cited by examiner

EQUATIONS ENLARGED FOR CLARITY

NONWETTED STATE 1

$\theta^*_{os(v)} = 0$
$\theta^*_{os(w)} = 0$
$\theta_{os(v)} = 0$
$\theta_{os(w)} = 0$

NONWETTED STATE 3

$\theta^*_{os(v)} = 0$
$\theta^*_{os(w)} = 0$
$\theta_{os(v)} = 0$
$\theta_{os(w)} > 0$

IMPALED STATE 1

$\theta^*_{os(v)} = 0$
$\theta^*_{os(w)} > 0$
$\theta_{os(v)} = 0$
$\theta_{os(w)} > 0$

NONWETTED STATE 2

$\theta^*_{os(v)} = 0$
$\theta^*_{os(w)} = 0$
$\theta_{os(v)} > 0$
$\theta_{os(w)} > 0$

NONWETTED STATE 4

$\theta^*_{os(v)} = 0$
$\theta_{os(v)} > 0$
$\theta^*_{os(w)} = 0$
$\theta_{os(w)} = 0$

IMPALED STATE 2

$\theta^*_{os(v)} = 0$
$\theta_{os(v)} > 0$
$\theta^*_{os(w)} > 0$
$\theta_{os(w)} > 0$

LIQUID-ENCAPSULATED RARE-EARTH BASED CERAMIC SURFACES

CROSS-REFERENCE TO RELATED APPLICATION

This application claims priority to and the benefit of, and incorporates herein by reference in its entirety, U.S. Provisional Patent Application No. 61/615,184, filed Mar. 23, 2012.

STATEMENT OF GOVERNMENT SUPPORT

This invention was made with Government support under Grant No. CBET-0952564 awarded by the National Science Foundation. The Government has certain rights in this invention.

TECHNICAL FIELD

This invention relates generally to materials with non-wetting surfaces and, more particularly, to surfaces comprising a rare-earth oxide ceramic and encapsulated with a liquid.

BACKGROUND

Articles with non-wetting or water-repellent surfaces are used in a wide variety of applications. A relatively recent approach in creating a non-wetting surfaces is to treat the surface so that it is rough or textured and then coat the surface with a material having low surface energy, such as a polymer or a fluoroalkylsilane. These surfaces, while generally non-wetting, face material-related drawbacks that limit their use in industrial applications, and other applications in which the surface is exposed to harsh environments.

For example, surfaces treated with polymers or fluoroalkylsilanes have insufficient mechanical resistance, chemical resistance, and thermal stability for many applications. While metals and ceramics are often useful for surfaces exposed to harsh environments, they are generally hydrophilic and do not provide desired non-wetting, water-repellent properties.

Another drawback of existing non-wetting surfaces is that they are susceptible to impalement, which reduces or destroys the non-wetting capabilities of the surface. Impalement occurs when an impinging liquid (e.g., a liquid droplet or liquid stream) displaces the air entrained within the surface textures.

There is a need for articles with improved non-wetting surfaces that can endure harsh industrial environments and that resist impalement.

SUMMARY OF THE INVENTION

Described herein are non-wetting surfaces comprising rare-earth containing ceramics. Furthermore, the surfaces include liquid impregnated within a matrix of micro- or nano-engineered features on the surface, or a liquid filling pores or other tiny wells on the surface.

The surfaces are non-wetting and can resist liquid impalement, ice formation, scale formation, hydrate formation, and/or have antifouling properties. The surfaces are useful for articles that must sustain harsh industrial environments such as steam, high temperature, and/or high pressure, while also resisting impalement.

In one aspect, the invention is directed to an article comprising a liquid-impregnated surface, the surface comprising a matrix of features spaced sufficiently close to stably contain (e.g., at equilibrium) a liquid therebetween or therewithin, wherein the surface comprises a rare earth element material. In certain embodiments, the liquid is stably contained between or within the matrix or features at equilibrium, the stably-contained liquid being a separate phase from a phase being repelled by the surface (e.g., the stably-contained liquid is a different material than the substance being repelled, e.g., where the substance being repelled is rain, ice, sleet, oil in a pipeline, etc.).

In certain embodiments, the surface is textured and the textured surface is coated (e.g., partially or completely) with a substance comprising the rare-earth element material.

In certain embodiments, the rare earth element material comprises a rare earth oxide, a rare earth carbide, a rare earth nitride, a rare earth fluoride, and/or a rare earth boride. In certain embodiments, the rare earth element material comprises scandium oxide ($Sc_2O_3$), yttrium oxide ($Y_2O_3$), lanthanum oxide ($La_2O_3$), cerium oxide ($CeO_2$), praseodymium oxide ($Pr_6O_{11}$), neodymium oxide ($Nd_2O_3$), samarium oxide ($Sm_2O_3$), europium oxide ($Eu_2O_3$), gadolinium oxide ($Gd_2O_3$), terbium oxide ($Tb_4O_7$), dysprosium oxide ($Dy_2O_3$), holmium oxide ($Ho_2O_3$), erbium oxide ($Er_2O_3$), thulium oxide ($Tm_2O_3$), ytterbium oxide ($Yb_2O_3$), lutetium oxide ($Lu_2O_3$), cerium carbide ($CeC_2$), praseodymium carbide ($PrC_2$), neodymium carbide ($NdC_2$), samarium carbide ($SmC_2$), europium carbide ($EuC_2$), gadolinium carbide ($GdC_2$), terbium carbide ($TbC_2$), dysprosium carbide ($DyC_2$), holmium carbide ($HoC_2$), erbium carbide ($ErC_2$), thulium carbide ($TmC_2$), ytterbium carbide ($YbC_2$), lutetium carbide ($LuC_2$), cerium nitride (CeN), praseodymium nitride (PrN), neodymium nitride (NdN), samarium nitride (SmN), europium nitride (EuN), gadolinium nitride (GdN), terbium nitride (TbN), dysprosium nitride (DyN), holmium nitride (HoN), erbium nitride (ErN), thulium nitride (TmN), ytterbium nitride (YbN), lutetium nitride (LuN), cerium fluoride ($CeF_3$), praseodymium fluoride ($PrF_3$), neodymium fluoride ($NdF_3$), samarium fluoride ($SmF_3$), europium fluoride ($EuF_3$), gadolinium fluoride ($GdF_3$), terbium fluoride ($TbF_3$), dysprosium fluoride ($DyF_3$), holmium fluoride ($HoF_3$), erbium fluoride ($ErF_3$), thulium fluoride ($TmF_3$), ytterbium fluoride ($YbF_3$), and/or lutetium fluoride ($LuF_3$).

In certain embodiments, the liquid has viscosity at room temperature no greater than about 1000 cP (or cSt), no greater than about 100 cP (or cSt), or no greater than about 50 cP (or cSt). In certain embodiments, the liquid has vapor pressure at room temperature no greater than about 20 mm Hg, no greater than about 1 mm Hg, or no greater than about 0.1 mmHg.

In certain embodiments, the features have substantially uniform height and wherein the liquid fills space between the features and coats the features with a layer at least about 5 nm in thickness over the top of the features. In certain embodiments, the features define pores or other wells and the liquid fills the features.

In certain embodiments, the liquid has receding contact angle of 0° such that the liquid forms a stable thin film on the top of the features.

In certain embodiments, the matrix has a feature-to-feature spacing from about 1 micrometer to about 100 micrometers. In certain embodiments, the matrix has a feature-to-feature spacing from about 5 nanometers to about 1 micrometer. In certain embodiments, the matrix comprises hierarchical structures. For example, the hierarchical structures may be micro-scale features that comprise nano-scale features thereupon.

In certain embodiments, the features have height no greater than about 100 micrometers. In certain embodiments, the features are posts. In certain embodiments, the features include one or more spherical particles, nanoneedles, nanograss, and/or random geometry features that provides surface roughness. In certain embodiments, the feature comprises one or more pores, cavities, interconnected pores, and/ or interconnected cavities. In certain embodiments, the surface comprises porous media with a plurality of pores having different sizes.

In certain embodiments, the liquid comprises a perfluorocarbon liquid, a perfluoroFluorinated vacuum oil (such as Krytox 1506 or Fromblin 06/6), a fluorinated coolant (e.g., perfluoro-tripentylamine sold as FC-70, manufactured by 3M), an ionic liquid, a fluorinated ionic liquid that is immiscible with water, a silicone oil comprising PDMS, a fluorinated silicone oil, a liquid metal, an electro-rheological fluid, a magneto-rheological fluid, a ferrofluid, a dielectric liquid, a hydrocarbon liquid, a fluorocarbon liquid, a refrigerant, a vacuum oil, a phase-change material, a semi-liquid, grease, synovial fluid, and/or a bodily fluid.

In certain embodiments, the article is a steam turbine part, a gas turbine part, an aircraft part, or a wind turbine part, and the liquid-impregnated surface is configured to repel impinging liquid. In certain embodiments, the article is eyeglasses, goggles, a ski mask, a helmet, a helmet face shield, or a mirror, and the liquid-impregnated surface is configured to inhibit fogging thereupon. In certain embodiments, the article is an aircraft part, a wind turbine part, a power transmission line, or a windshield, and the liquid-impregnated surface is configured to inhibit formation of ice thereupon. In certain embodiments, the article is a pipeline (or a part or coating thereof), and the liquid-impregnated surface is configured to inhibit the formation of hydrate thereupon and/or enhance the slippage (reduce drag) of fluid flowing thereupon (or therethrough). In certain embodiments, the article is a heat exchanger part or an oil or gas pipeline (or a part or coating thereof), and the liquid-impregnated surface is configured to inhibit the formation and/or adhesion of salt thereupon. In certain embodiments, the liquid-impregnated surface is configured to inhibit corrosion.

In certain embodiments, the liquid-impregnated surface is substantially transparent. For example, the refractive index of the liquid and solid surface can be matched to achieve substantially full transparency. This may be useful, for example, where both hydrophobicity and transparency is desired, for example, solar panels, mirrors, glasses, and the like.

In another aspect, the invention is directed to an article comprising a base substrate; and a hydrophobic coating on the base substrate, the hydrophobic coating comprising a rare earth element material, wherein the hydrophobic coating is substantially transparent or translucent. For example, the coating, or surface itself, is thin enough to achieve transparency or translucency. This may be useful, for example, where both hydrophobicity and transparency is desired, for example, solar panels, mirrors, glasses, and the like. In some embodiments, an exposed surface of the hydrophobic coating has a dynamic contact angle with water of at least about 90 degrees.

In another aspect, the invention is directed to a method of using an article comprising a liquid-impregnated surface, the method comprising: (a) providing a surface comprising a matrix of features spaced sufficiently close to stably contain a liquid therebetween or therewithin, wherein the surface comprises a rare earth element material; and (b) exposing the surface to a primary liquid (e.g., water or oil) different from the stably-contained liquid.

In another aspect, the invention is directed to a method of using any of the articles as described herein to repel an external substance from the surface of the article, wherein the external substance has a different composition than the stably-contained liquid.

BRIEF DESCRIPTION OF THE DRAWINGS

The objects and features of the invention can be better understood with reference to the drawings described below, and the claims.

FIG. 8 is a schematic showing conditions for the six liquid-impregnated surface wetting states shown in FIG. 7, in accordance with certain embodiments of the invention.

DESCRIPTION

Figure 1A:
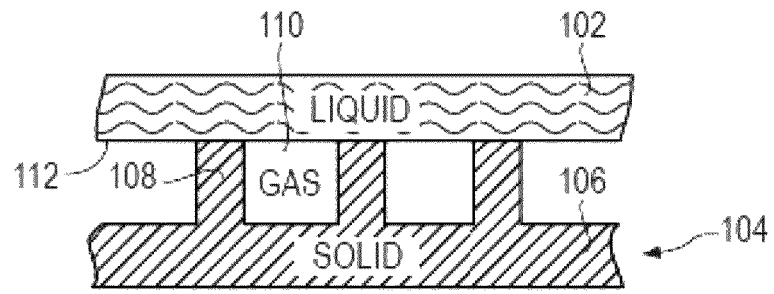
FIG. 1a is a schematic cross-sectional view of a liquid contacting a non-wetting surface, in accordance with certain embodiments of the invention.

It is contemplated that articles, apparatus, methods, and processes of the claimed invention encompass variations and adaptations developed using information from the embodiments described herein. Adaptation and/or modification of the articles, apparatus, methods, and processes described herein may be performed by those of ordinary skill in the relevant art.

Throughout the description, where articles and apparatus are described as having, including, or comprising specific components, or where processes and methods are described as having, including, or comprising specific steps, it is contemplated that, additionally, there are articles and apparatus of the present invention that consist essentially of, or consist of, the recited components, and that there are processes and methods according to the present invention that consist essentially of, or consist of, the recited processing steps.

It should be understood that the order of steps or order for performing certain actions is immaterial so long as the invention remains operable. Moreover, two or more steps or actions may be conducted simultaneously.

The mention herein of any publication, for example, in the Background section, is not an admission that the publication serves as prior art with respect to any of the claims presented herein. The Background section is presented for purposes of clarity and is not meant as a description of prior art with respect to any claim.

Described herein are non-wetting surfaces that comprise rare-earth containing ceramics and that are structured to retain an encapsulated/impregnated liquid thereupon. The superhydrophobic ceramic provides a more durable surface resistant to harsh environments, while the impregnated liquid resists impalement, thereby enhancing the hydrophobicity/water-repellency of the surface. The surface is more robust than state-of-the-art surfaces comprising polymeric modifiers such as Teflon or fluorosilane.

Incorporated herein by reference is U.S. patent application Ser. No. 13/302,356, filed Nov. 22, 2011; U.S. patent application Ser. No. 13/428,652, filed Mar. 23, 2012; and U.S. Provisional Patent Application No. 61/728,219, filed Nov. 19, 2012. Features described in any of these patent applications may be applied in various combinations in the embodiments described herein.

In one aspect, the invention is directed to an article including a liquid-impregnated surface, said surface including a matrix of solid features spaced sufficiently close to stably contain a liquid therebetween and/or therewithin, wherein the features and liquid are non-toxic and/or edible. In certain embodiments, the liquid is stably contained within the matrix regardless of orientation of the article and/or under normal shipping and/or handling conditions. In certain embodiments, the article is a container of a consumer product. In certain embodiments, the solid features include particles. In certain embodiments, the particles have an average characteristic dimension in a range, for example, of about 5 microns to about 500 microns, or about 5 microns to about 200 microns, or about 10 microns to about 50 microns. In certain embodiments, the characteristic dimension is a diameter (e.g., for roughly spherical particles), a length (e.g., for roughly rod-shaped particles), a thickness, a depth, or a height. In certain embodiments, the particles include insoluble fibers, purified wood cellulose, micro-crystalline cellulose, oat bran fiber, kaolinite (clay mineral), Japan wax (obtained from berries), pulp (spongy part of plant stems), ferric oxide, iron oxide, sodium formate, sodium oleate, sodium palmitate, sodium sulfate, wax, carnauba wax, beeswax, candelilla wax, zein (from corn), dextrin, cellulose ether, Hydroxyethyl cellulose, Hydroxypropyl cellulose (HPC), Hydroxyethyl methyl cellulose, Hydroxypropyl methyl cellulose (HPMC), and/or Ethyl hydroxyethyl cellulose. In certain embodiments, the particles include a wax. In certain embodiments, the particles are randomly spaced. In certain embodiments, the particles are arranged with average spacing of about 1 micron to about 500 microns, or from about 5 microns to about 200 microns, or from about 10 microns to about 30 microns between adjacent particles or clusters of particles. In certain embodiments, the particles are spray-deposited (e.g., deposited by aerosol or other spray mechanism). In certain embodiments, the consumer product comprises at least one member selected from the group consisting of ketchup, catsup, mustard, mayonnaise, syrup, honey, jelly, peanut butter, butter, chocolate syrup, shortening, butter, margarine, oleo, grease, dip, yogurt, sour cream, cosmetics, shampoo, lotion, hair gel, and toothpaste. In certain embodiments, a food product is sticky food (e.g., candy, chocolate syrup, mash, yeast mash, beer mash, taffy), food oil, fish oil, marshmallow, dough, batter, baked goods, chewing gum, bubble gum, butter, cheese, cream, cream cheese, mustard, yogurt, sour cream, curry, sauce, ajvar, currywurst sauce, salsa lizano, chutney, pebre, fish sauce, tzatziki, sriracha sauce, vegemite, chimichurri, HP sauce/brown sauce, harissa, kochujang, hoisan sauce, kim chi, cholula hot sauce, tartar sauce, tahini, hummus, shichimi, ketchup, Pasta sauce, Alfredo sauce, Spaghetti sauce, icing, dessert toppings, or whipped cream. In certain embodiments, the container of the consumer product is shelf-stable when filled with the consumer product. In certain embodiments, the consumer product has a viscosity of at least about 100 cP at room temperature. In certain embodiments, the consumer product has a viscosity of at least about 1000 cP at room temperature. In certain embodiments, the consumer product is a non-Newtonian material. In certain embodiments, the consumer product comprises a Bingham plastic, a thixotropic fluid, and/or a shear-thickening substance. In certain embodiments, the liquid includes a food additive (e.g., ethyl oleate), fatty acids, proteins, and/or a vegetable oil (e.g., olive oil, light olive oil, corn oil, soybean oil, rapeseed oil, linseed oil, grapeseed oil, flaxseed oil, canola oil, peanut oil, safflower oil, sunflower oil). In certain embodiments, the article is a component of consumer product processing equipment. In certain embodiments, the article is a component of food processing equipment that comes into contact with food. In certain embodiments, the liquid-impregnated surface has solid-to-liquid ratio less than about 50 percent, or less than about 25 percent, or less than about 15 percent.

In another aspect, the invention is directed to a method of manufacturing a container of a consumer product, the method including the steps of: providing a substrate; applying a texture to the substrate, the texture comprising a matrix of solid features spaced sufficiently close to stably contain a liquid therebetween and/or therewithin (e.g., for example, stably contained when the container is in any orientation, or undergoing normal shipping and/or handling conditions throughout the useful lifetime of the container); and impregnating the matrix of solid features with the liquid, wherein the solid features and the liquid are non-toxic and/or edible. In certain embodiments, the solid features are particles. In certain embodiments, the applying step includes spraying a mixture of a solid and a solvent onto the textured substrate. In certain embodiments, the solid insoluble fibers, purified wood cellulose, micro-crystalline cellulose, oat bran fiber, kaolinite (clay mineral), Japan wax (obtained from berries), pulp (spongy part of plant stems), ferric oxide, iron oxide, sodium formate, sodium oleate, sodium palmitate, sodium sulfate, wax, carnauba wax, beeswax, candelilla wax, zein (from corn), dextrin, cellulose ether, Hydroxyethyl cellulose, Hydroxypropyl cellulose (HPC), Hydroxyethyl methyl cellulose, Hydroxypropyl methyl cellulose (HPMC), and/or Ethyl hydroxyethyl cellulose. In certain embodiments, the method includes the step of allowing the solvent to evaporate following the spraying of the mixture onto the textured substrate and before the impregnating step. In certain embodiments, the method includes the step of contacting the impregnated matrix of features with a consumer product. In certain embodiments, the consumer product is ketchup, catsup, mustard, mayonnaise, syrup, honey, jelly, peanut butter, butter, chocolate syrup, shortening, butter, margarine, oleo, grease, dip, yogurt, sour cream, cosmetics, shampoo, lotion, hair gel, or toothpaste. In certain embodiments. In certain embodiments, the consumer product is a sticky food (e.g., candy, chocolate syrup, mash, yeast mash, beer mash, taffy), food oil, fish oil, marshmallow, dough, batter, baked goods, chewing gum, bubble gum, butter, cheese, cream, cream cheese, mustard, yogurt, sour cream, curry, sauce, ajvar, currywurst sauce, salsa lizano, chutney, pebre, fish sauce, tzatziki, sriracha sauce, vegemite, chimichurri, HP sauce/brown sauce, harissa, kochujang, hoisan sauce, kim chi, cholula hot sauce, tartar sauce, tahini, hummus, shichimi, ketchup, Pasta sauce, Alfredo sauce, Spaghetti sauce, icing, dessert toppings, or whipped cream. In certain embodiments, the liquid includes a food additive (e.g., ethyl oleate), fatty acids, proteins, and/or vegetable oil (e.g., olive oil, light olive oil, corn oil, soybean oil, rapeseed oil, linseed oil, grapeseed oil, flaxseed oil, canola oil, peanut oil, safflower oil, and/or sunflower oil). In certain embodiments, the step of applying the texture to the substrate includes: exposing the substrate to a solvent (e.g., solvent-induced crystallization), extruding or blow-molding a mixture of materials, roughening the substrate with mechanical action (e.g., tumbling with an abrasive), spray-coating, polymer spinning, depositing particles from solution (e.g., layer-by-layer deposition and/or evaporating away liquid from a liquid and particle suspension), extruding or blow-molding a foam or foam-forming material (e.g., a polyurethane foam), depositing a polymer from a solution, extruding or blow-molding a material that expands upon cooling to leave a wrinkled or textured surface, applying a layer of material onto a surface that is under tension or compression, performing non-solvent induced phase separation of a polymer to obtain a porous structure, performing micro-contact printing, performing laser rastering, performing nucleation of the solid texture out of vapor (e.g., desublimation), performing anodization, milling, machining, knurling, e-beam milling, performing thermal or chemical oxidation, and/or performing chemical vapor deposition. In certain embodiments, applying the texture to the substrate includes spraying a mixture of edible particles onto the substrate. In certain embodiments, impregnating the matrix of features with the liquid includes: spraying the encapsulating liquid onto the matrix of features, brushing the liquid onto the matrix of features, submerging the matrix of features in the liquid, spinning the matrix of features, condensing the liquid onto the matrix of features, depositing a solution comprising the liquid and one or more volatile liquids, and/or spreading the liquid over the surface with a second immiscible liquid. In certain embodiments, the liquid is mixed with a solvent and then sprayed, because the solvent will reduce the liquid viscosity, allowing it to spray more easily and more uniformly. Then, the solvent will dry out of the coating. In certain embodiments, the method further includes chemically modifying the substrate prior to applying the texture to the substrate and/or chemically modifying the solid features of the texture. For example, the method may include chemically modifying with a material having contact angle with water of greater than 70 degrees (e.g., hydrophobic material). The modification may be conducted, for example, after the texture is applied, or may be applied to particles prior to their application to the substrate. In certain embodiments, impregnating the matrix of features includes removing excess liquid from the matrix of features. In certain embodiments, removing the excess liquid includes: using a second immiscible liquid to carry away the excess liquid, using mechanical action to remove the excess liquid, absorbing the excess liquid using a porous material, and/or draining the excess liquid off of the matrix of features using gravity or centrifugal forces.

Rare Earth Element Materials

As used herein, a "rare earth element material" is understood to mean a material with at least one component that contains (or is) a rare earth element material. For example, a rare earth element material may contain or be a compound with a rare earth element chemical symbol in its chemical formula.

In certain embodiments, a rare earth element material includes any material having at least one rare earth element. The rare earth element may include, for example, scandium (Sc), yttrium (Y), lanthanum (La), cerium (Ce), praseodymium (Pr), neodymium (Nd), samarium (Sm), europium (Eu), gadolinium (Gd), terbium (Tb), dysprosium (Dy), holmium (Ho), erbium (Er), thulium (Tm), ytterbium (Yb), and/or lutetium (Lu). In some embodiments, the rare earth element material comprises an elemental form of one or more rare earth elements. In certain embodiments, the rare earth element material includes one or more rare earth compounds.

In various embodiments, a rare earth element material includes or consists of a rare earth oxide, a rare earth carbide, a rare earth nitride, a rare earth fluoride, and/or a rare earth boride. For example, in one embodiment, the rare earth oxide includes scandium oxide ($Sc_2O_3$), yttrium oxide ($Y_2O_3$), lanthanum oxide ($La_2O_3$), cerium oxide ($CeO_2$), praseodymium oxide ($Pr_6O_{11}$), neodymium oxide ($Nd_2O_3$), samarium oxide ($Sm_2O_3$), europium oxide ($Eu_2O_3$), gadolinium oxide ($Gd_2O_3$), terbium oxide ($Tb_4O_7$), dysprosium oxide ($Dy_2O_3$), holmium oxide ($Ho_2O_3$), erbium oxide ($Er_2O_3$), thulium oxide ($Tm_2O_3$), ytterbium oxide ($Yb_2O_3$), and/or lutetium oxide ($Lu_2O_3$). Likewise, the rare earth carbide may include cerium carbide ($CeC_2$), praseodymium carbide ($PrC_2$), neodymium carbide ($NdC_2$), samarium carbide ($SmC_2$), europium carbide ($EuC_2$), gadolinium carbide ($GdC_2$), terbium carbide ($TbC_2$), dysprosium carbide ($DyC_2$), holmium carbide ($HoC_2$), erbium carbide ($ErC_2$), thulium carbide ($TmC_2$), ytterbium carbide ($YbC_2$), and/or lutetium carbide ($LuC_2$). Possible rare earth nitrides include cerium nitride (CeN), praseodymium nitride (PrN), neodymium nitride (NdN), samarium nitride (SmN), europium nitride (EuN), gadolinium nitride (GdN), terbium nitride (TbN), dysprosium nitride (DyN), holmium nitride (HoN), erbium nitride (ErN), thulium nitride (TmN), ytterbium nitride (YbN), and/or lutetium nitride (LuN). Examples of rare earth fluorides include cerium fluoride ($CeF_3$), praseodymium fluoride ($PrF_3$), neodymium fluoride ($NdF_3$), samarium fluoride ($SmF_3$), europium fluoride ($EuF_3$), gadolinium fluoride ($GdF_3$), terbium fluoride ($TbF_3$), dysprosium fluoride ($DyF_3$), holmium fluoride ($HoF_3$), erbium fluoride ($ErF_3$), thulium fluoride ($TmF_3$), ytterbium fluoride ($YbF_3$), and/or lutetium fluoride ($LuF_3$).

In certain embodiments, a rare earth element material includes a light rare earth element having an atomic number less than or equal to 63 and/or a heavy rare earth element having an atomic number greater than 63. With respect to rare earth oxides, for example, a light rare earth oxide may include scandium oxide ($Sc_2O_3$), yttrium oxide ($Y_2O_3$), lanthanum oxide ($La_2O_3$), cerium oxide ($CeO_2$), praseodymium oxide ($Pr_6O_{11}$), neodymium oxide ($Nd_2O_3$), samarium oxide ($Sm_2O_3$), and/or europium oxide ($Eu_2O_3$). Likewise, in certain embodiments, a heavy rare earth oxide includes gadolinium oxide ($Gd_2O_3$), terbium oxide ($Tb_4O_7$), dysprosium oxide ($Dy_2O_3$), holmium oxide ($Ho_2O_3$), erbium oxide ($Er_2O_3$), thulium oxide ($Tm_2O_3$), ytterbium oxide ($Yb_2O_3$), and/or lutetium oxide ($Lu_2O_3$).

In certain embodiments, a rare earth element material includes any possible combination of two or more rare earth element materials. For example, the rare earth element material may include a first rare earth oxide, a first rare earth carbide, a first rare earth nitride, a first rare earth fluoride, and/or a first rare earth boride combined with a second rare earth oxide, a second rare earth carbide, a second rare earth nitride, a second rare earth fluoride, and/or a second rare earth boride. As another example, the rare earth element material may include two or more rare earth oxides, two or more rare earth carbides, two or more rare earth nitrides, two or more rare earth fluorides, and/or two or more rare earth borides.

In certain embodiments, a chemical formula for the rare earth element material is $R\Phi_x$, where R represents one or more rare earth elements in any molar ratio, $\Phi$ represents oxygen, carbon, nitrogen, fluorine, boron, or combinations thereof, in any molar ratio, and x is a number of atoms in the material or compound. Depending on the composition of the rare earth element material, x may or may not be an integer.

In various embodiments, a surface described herein includes a rare earth element material combined with a non-rare earth element material (i.e., a material that does not include a rare earth element). For example, the rare earth element material (e.g., a rare earth oxide) may be combined with one or more metals or ceramics, including a metal oxide, a metal nitride, a metal carbide, a metal fluoride, and/or a metal boride.

Articles/surfaces comprising rare earth element materials are further described in U.S. patent application Ser. No. 13/428,652, titled, "Hydrophobic Materials Incorporating Rare Earth Elements and Methods of Manufacture," filed Mar. 23, 2012, the disclosure of which is hereby incorporated by reference herein in its entirety. Features of the articles and surfaces described in this patent application may be applied in various combinations in the embodiments described herein.

In certain embodiments, articles and/or surfaces described herein include a coating. The coating includes or consists of one or more rare earth element materials, such as one or more rare earth oxides. A thickness of the coating may be within a range, for example, from about 100 nm to about 200 nm, from about 200 nm to about 300 nm, from about 300 nm to about 400 nm, or from about 400 nm to about 500 nm. In certain embodiments, the thickness of the coating is within a range from about 200 nm to about 350 nm. In various embodiments, the weight percent of a rare earth element material in the coating is at least about 10 percent, at least about 25 percent, at least about 50 percent, at least about 75 percent, or at least about 90 percent.

A method of producing the articles and/or surfaces includes applying the coating onto the surfaces using, for example, sputtering, sintering, and/or spraying. In some embodiments, an adhesion or bonding layer is disposed between the coating and the base substrate. The bonding layer may provide improved adhesion between the coating and the base substrate. The bonding or adhesion layer may include, for example, a metal, an intermetallic, an alloy, and/or a ceramic. Specific examples include indium (In), titanium (Ti), titanium nitride (TiN), chromium nitride (CrN), nickel aluminide (e.g., NiAl), MCrAlY, platinum, nickel, and/or aluminum.

Liquid Impregnation

In certain embodiments, a static contact angle $\theta$ between a liquid and solid is defined as the angle formed by a liquid drop on a solid surface as measured between a tangent at the contact line, where the three phases—solid, liquid, and vapor—meet, and the horizontal. The term "contact angle" usually implies the static contact angle $\theta$ since the liquid is merely resting on the solid without any movement.

As used herein, dynamic contact angle, $\theta_d$, is a contact angle made by a moving liquid on a solid surface. In the context of droplet impingement, $\theta_d$ may exist during either advancing or receding movement.

As used herein, a surface is "non-wetting" if it has a dynamic contact angle with a liquid of at least 90 degrees. Examples of non-wetting surfaces include, for example, superhydrophobic surfaces, superoleophobic surfaces, and supermetallophobic surfaces.

As used herein, contact angle hysteresis (CAH) is $CAH=\theta_a-\theta_r$, where $\theta_a$ and $\theta_r$ are advancing and receding contact angles, respectively, formed by a liquid on a solid surface. The advancing contact angle $\theta_a$ is the contact angle formed at the instant when a contact line is about to advance, whereas the receding contact angle $\theta_r$ is the contact angle formed when a contact line is about to recede.

FIG. 1a is a schematic cross-sectional view of a contacting liquid 102 in contact with a traditional or previous non-wetting surface 104 (i.e., a gas impregnating surface), in accordance with one embodiment of the invention. The surface 104 includes a solid 106 having a surface texture defined by posts 108. The regions between the posts 108 are occupied by a gas 110, such as air. As depicted, while the contacting liquid 102 is able to contact the tops of the posts 108, a gas-liquid interface 112 prevents the liquid 102 from wetting the entire surface 104.

Figure 1B:
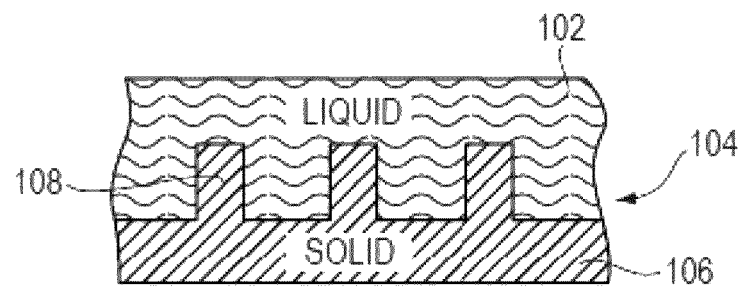
FIG. 1b is a schematic cross-sectional view of a liquid that has impaled a non-wetting surface, in accordance with certain embodiments of the invention.

Referring to FIG. 1b, in certain instances, the contacting liquid 102 may displace the impregnating gas and become impaled within the posts 108 of the solid 106. Impalement may occur, for example, when a liquid droplet impinges the surface 104 at high velocity. When impalement occurs, the gas occupying the regions between the posts 108 is replaced with the contacting liquid 102, either partially or completely, and the surface 104 may lose its non-wetting capabilities.

Figure 1C:
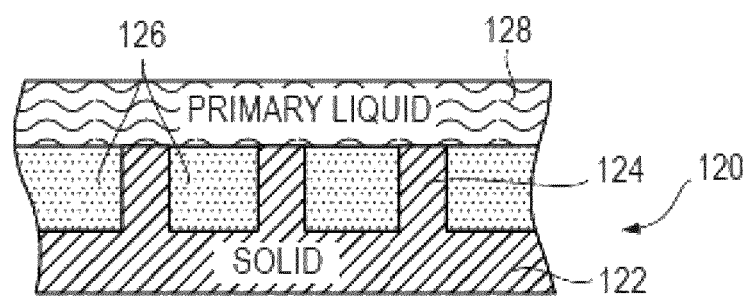
FIG. 1c is a schematic cross-sectional view of a liquid in contact with a liquid-impregnated surface, in accordance with certain embodiments of the invention.

Referring to FIG. 1c, in certain embodiments, a non-wetting, liquid-impregnated surface 120 is provided that includes a solid 122, e.g., a solid including or consisting of a rare earth element material, the solid having textures (e.g., posts 124) that are impregnated with an impregnating liquid 126, rather than a gas. In the depicted embodiment, a contacting liquid 128 in contact with the surface, rests on the posts 124 (or other texture) of the surface 120. In the regions between the posts 124, the contacting liquid 128 is supported by the impregnating liquid 126. In certain embodiments, the contacting liquid 128 is immiscible with the impregnating liquid 126. For example, the contacting liquid 128 may be water and the impregnating liquid 126 may be oil.

In addition to a rare earth element material, the solid 122 may include any intrinsically hydrophobic, oleophobic, and/or metallophobic material or coating. For example, the solid 122 may include: hydrocarbons, such as alkanes, and fluoropolymers, such as teflon, trichloro(1H,1H,2H,2H-perfluorooctyl)silane (TCS), octadecyltrichlorosilane (OTS), heptadecafluoro-1,1,2,2-tetrahydrodecyltrichlorosilane, fluoroPOSS, and/or other fluoropolymers. Additional possible materials or coatings for the solid 122 include: ceramics, polymeric materials, fluorinated materials, intermetallic compounds, and composite materials. Polymeric materials may include, for example, polytetrafluoroethylene, fluoroacrylate, fluoroeurathane, fluorosilicone, fluorosilane, modified carbonate, chlorosilanes, silicone, polydimethylsiloxane (PDMS), and/or combinations thereof. Ceramics may include, for example, titanium carbide, titanium nitride, chromium nitride, boron nitride, chromium carbide, molybdenum carbide, titanium carbonitride, electroless nickel, zirconium nitride, fluorinated silicon dioxide, titanium dioxide, tantalum oxide, tantalum nitride, diamond-like carbon, fluorinated diamond-like carbon, and/or combinations thereof. Intermetallic compounds may include, for example, nickel aluminide, titanium aluminide, and/or combinations thereof.

The textures within the liquid-impregnated surface 120 are physical textures or surface roughness. The textures may be random, including fractal, or patterned. In certain embodiments, the textures are micro-scale or nano-scale features. For example, the textures may have a length scale L (e.g., an average pore diameter, or an average protrusion height) that is less than about 100 microns, less than about 10 microns, less than about 1 micron, less than about 0.1 microns, or less than about 0.01 microns. In certain embodiments, the texture includes posts 124 or other protrusions, such as spherical or hemispherical protrusions. Rounded protrusions may be preferable to avoid sharp solid edges and minimize pinning of liquid edges. The texture may be introduced to the surface using any conventional method, including mechanical and/or chemical methods such as lithography, self-assembly, and deposition, for example.

The impregnating liquid 126 may be any type of liquid that is capable of providing the desired non-wetting properties. For example, the impregnating liquid 126 may be oil-based or water-based (i.e., aqueous). In certain embodiments, the impregnating liquid 126 is an ionic liquid (e.g., BMI-IM). Other examples of possible impregnating liquids include hexadecane, vacuum pump oils (e.g., FOMBLIN® 06/6, KRYTOX® 1506) silicon oils (e.g., 10 cSt or 1000 cSt), fluorocarbons (e.g., perfluoro-tripentylamine, FC-70), shear-thinning fluids, shear-thickening fluids, liquid polymers, dissolved polymers, viscoelastic fluids, and/or liquid fluoro-POSS. In certain embodiments, the impregnating liquid is (or comprises) a liquid metal, a dielectric fluid, a ferro fluid, a magneto-rheological (MR) fluid, an electro-rheological (ER) fluid, an ionic fluid, a hydrocarbon liquid, and/or a fluorocarbon liquid. In one embodiment, the impregnating liquid 126 is made shear thickening with the introduction of nano particles. A shear-thickening impregnating liquid 126 may be desirable for preventing impalement and resisting impact from impinging liquids, for example.

To minimize evaporation of the impregnating liquid 126 from the surface 120, it is generally desirable to use impregnating liquids 126 that have low vapor pressures (e.g., less than 0.1 mmHg, less than 0.001 mmHg, less than 0.00001 mmHg, or less than 0.000001 mmHg). In certain embodiments, the impregnating liquid 126 has a freezing point of less than −20° C., less than −40° C., or about −60° C. In certain embodiments, the surface tension of the impregnating liquid 126 is about 15 mN/m, about 20 mN/m, or about 40 mN/m. In certain embodiments, the viscosity of the impregnating liquid 126 is from about 10 cSt to about 1000 cSt).

The impregnating liquid 126 may be introduced to the surface 120 using any conventional technique for applying a liquid to a solid. In certain embodiments, a coating process, such as a dip coating, blade coating, or roller coating, is used to apply the impregnating liquid 126. Alternatively, the impregnating liquid 126 may be introduced and/or replenished by liquid materials flowing past the surface 120 (e.g., in a pipeline). After the impregnating liquid 126 has been applied, capillary forces hold the liquid in place. Capillary forces scale roughly with the inverse of feature-to-feature distance or pore radius, and the features may be designed such that the liquid is held in place despite movement of the surface and despite movement of air or other fluids over the surface (e.g., where the surface 120 is on the outer surface of an aircraft with air rushing over, or in a pipeline with oil and/or other fluids flowing therethrough). In certain embodiments, nano-scale features are used (e.g., 1 nanometer to 1 micrometer) where high dynamic forces, body forces, gravitational forces, and/or shearing forces could pose a threat to remove the liquid film, e.g., for surfaces used in fast flowing pipelines, on airplanes, on wind turbine blades, etc. Small features may also be useful to provide robustness and resistance to impact.

Compared to gas-impregnated surfaces, the liquid-impregnated surfaces described herein offer several advantages. For example, because liquids are incompressible over a large range of pressures, liquid-impregnated surfaces are generally more resistant to impalement. In certain embodiments, while nano-scale (e.g., less than one micron) textures may be necessary to avoid impalement with gas-impregnated surfaces, micro-scale (e.g., from 1 micron to about 100 microns) textures are sufficient for avoiding impalement with liquid-impregnated surface. As mentioned, micro-scale textures are much easier to manufacture and more practical than nano-scale textures.

Liquid-impregnated surfaces are also useful for reducing viscous drag between a solid surface and a flowing liquid. In general, the viscous drag or shear stress exerted by a liquid flowing over a solid surface is proportional to the viscosity of the liquid and the shear rate adjacent to the surface. A traditional assumption is that liquid molecules in contact with the solid surface stick to the surface, in a so-called "no-slip" boundary condition. While some slippage may occur between the liquid and the surface, the no-slip boundary condition is a useful assumption for most applications.

In certain embodiments, non-wetting surfaces, such as liquid-impregnated surfaces, are desirable as they induce a large amount of slip at the solid surface. For example, referring again to FIGS. 1a and 1c, when a contacting liquid 102, 128 is supported by an impregnating liquid 126 or a gas, the liquid-liquid or liquid-gas interface is free to flow or slip with respect to the underlying solid material. Drag reductions of as much as 40% may be achieved due to this slippage. As mentioned, however, gas-impregnated surfaces are susceptible to impalement. When impalement occurs with a gas-impregnated surface, the benefits of reduced drag reduction may be lost.

Liquid-impregnated surfaces are generally described in U.S. patent application Ser. No. 13/302,356, titled "Liquid-Impregnated Surfaces, Methods of Making, and Devices Incorporating the Same," filed Nov. 22, 2011, the disclosure of which is hereby incorporated by reference herein in its entirety. Features of the articles and surfaces described in the above-mentioned patent application may be applied in various combinations in the embodiments described herein.

In various embodiments, the impregnating liquid is a different liquid (and/or phase) than a substance the surface is designed or configured to come into contact with, e.g., rain, ice, sleet, oil in a pipeline, etc.

Uses and Applications

There are a large number of applications for articles and parts with the liquid-encapsulated, rare-earth based ceramic surfaces described herein. For example, articles and parts with such surfaces can be used on airplanes, wind turbines, and power lines, for water repellency and resistance to ice formation thereupon. Such surfaces may also be used for reduction of scale formation and anti-fouling properties in the desalination and oil/gas industries. Furthermore, such surfaces may be used for reducing viscosity drag in oil pipelines.

Figure 2:
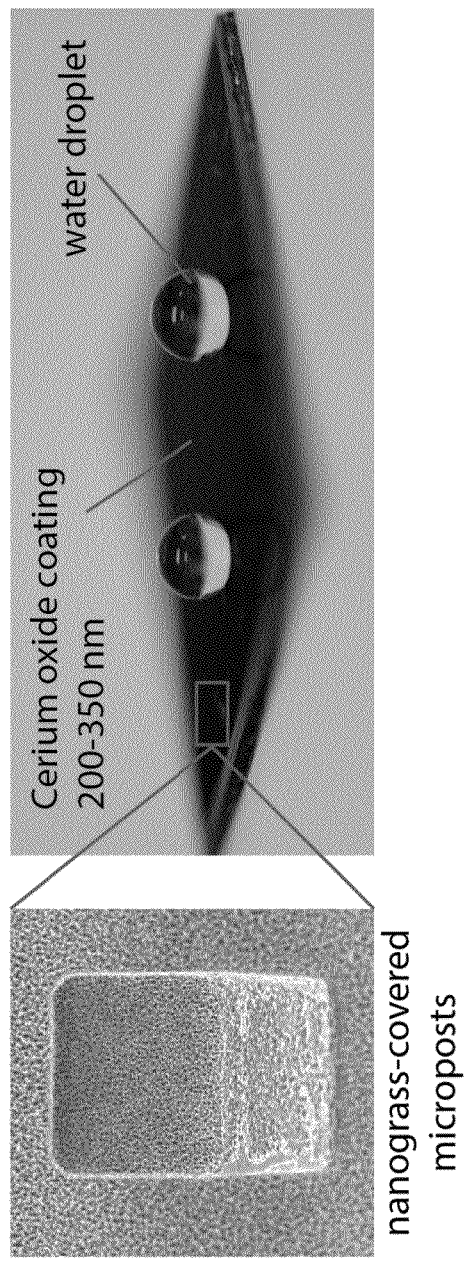
FIG. 2 shows a superhydrophobic surface created by depositing a rare-earth oxide on a surface having an array of textured posts, according to an illustrative embodiment of the invention.

FIG. 2 shows a superhydrophobic surface created by sputtering cerium oxide, an example rare-earth oxide, on a substrate having an array of posts (e.g., spaced-apart by a distance from about 10 μm to about 30 μm) which were textured with nano-grass. Here, the array of square posts was fabricated using a standard photolithography process on a silicon substrate. The posts were arranged in square arrays with width, a, about 10 μm, height, h, about 10 μm, and spacing, b, about 15-30 μm. To grow the nanograss, the posts were placed inside an inductively coupled plasma chamber with a controlled flow of etching gases ($SF_6/O_2$). The average width of the grass wires was about 100 nm with spacing of about 100-200 nm. After this step, a thin layer (about 200-350 nm) of ceria(cerium oxide) was sputtered on the nanograss-covered posts. The resulting surface is superhydrophobic with advancing water contact angle about 160°. The surface was then deep-coated with silicone oil (10 cS) to obtain a liquid-encapsulated surface.

Figure 3:
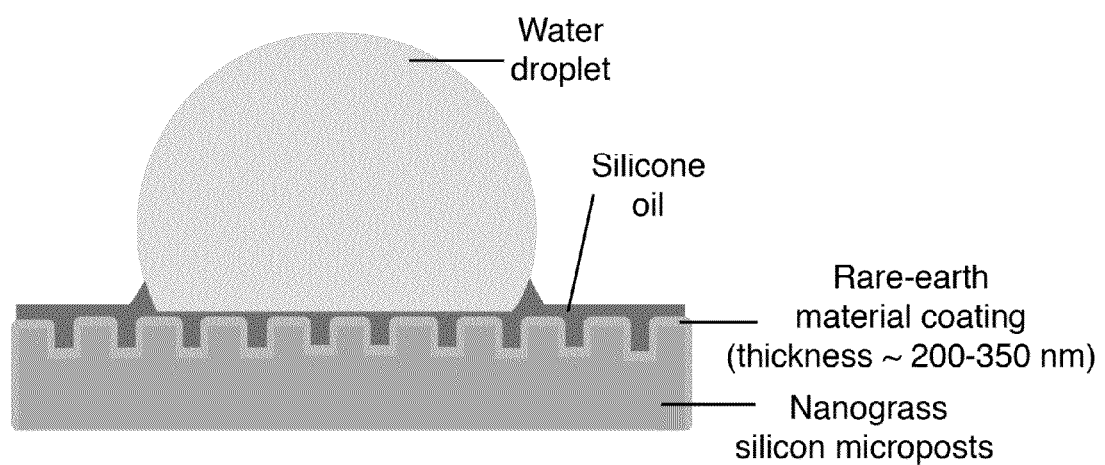
FIG. 3 is a schematic of a water droplet resting on a liquid-encapsulated surface having a rare-earth material coating, according to an illustrative embodiment of the invention.

FIG. 3 is a schematic of a water droplet resting on the liquid-encapsulated surface described above having a rare earth based coating. The substrate may comprise, for example, a metal (e.g., aluminum, iron, copper, titanium, tin, etc.), a metal oxide (e.g., aluminium oxide, iron oxide, copper oxide, titanium oxide, tin oxide, etc.), a ceramic (e.g., nitrides and/or carbides of boron, titanium, aluminum, silicon, etc.), a composite, and/or an alloy (e.g., steel). The surface of the substrate is structured (e.g., with microposts or other geometric feature) to retain the impregnating/encapsulating liquid, and this structure is textured (e.g., with nanograss, nanowire, or other texture) then coated (e.g., sputtered) either partially or completely with a substance comprising a rare earth element material, for example, an oxide, nitride, fluoride, carbide, bromide of a rare-earth metal (e.g., scandium, yttrium, lanthanum, cerium, praseodymium, neodymium, samarium, europium, gadolinium, terbium, dysprosium, holmium, erbium, thulium, ytterbium, or lutetium). The thickness of the rare-earth material coating may be, for example, from about 200 nm to about 350 nm. The liquid may be, for example, an oil such as silicone oil, or other hydrophobic liquid.

Figure 4:
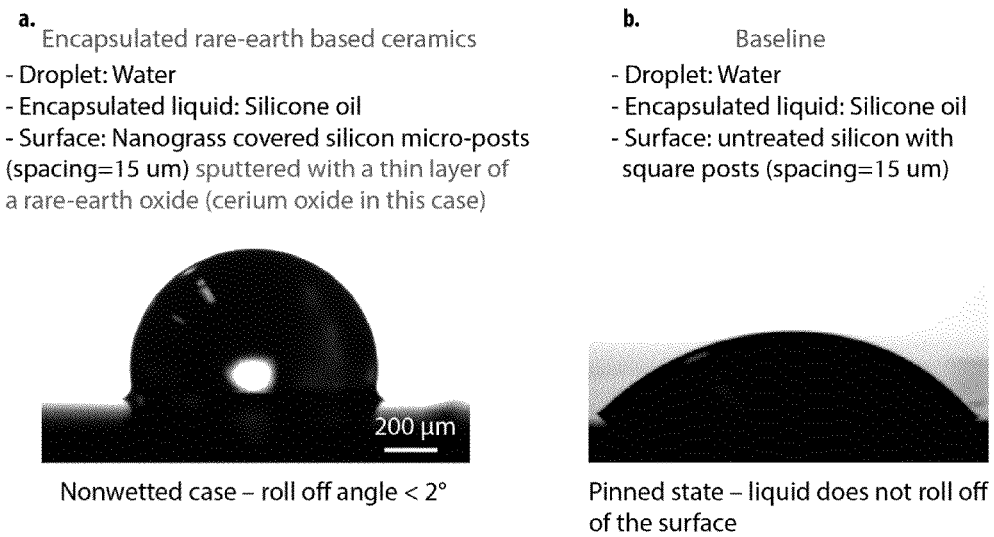
FIG. 4 shows the difference between a water droplet resting on an untreated surface with encapsulated liquid, and a water droplet resting on a treated surface comprising a rare-earth oxide with encapsulated liquid, according to an illustrative embodiment of the invention.

FIG. 4 shows two photos demonstrating the difference between a water droplet resting on an untreated surface with encapsulated liquid, and a water droplet resting on a treated surface comprising a rare-earth oxide with encapsulated liquid. FIG. 4b shows a "baseline" example with a water droplet on a surface of untreated silicon with square posts at 15 µm spacing and with a silicone oil encapsulating liquid. In FIG. 4b, the water droplet is in a pinned state and does not roll off of the surface.

In contrast, FIG. 4a shows an example of a liquid-encapsulated rare-earth based ceramic surface. The photo of FIG. 4a shows a water droplet on a surface of silicon with square posts at 15 µm spacing and with a silicone oil encapsulating liquid, where the silicon surface is textured with a nanograss (via the treatment described above) and sputtered with a thin layer of a rare-earth oxide (here, cerium oxide). In FIG. 4a, the water droplet does not wet the surface, and rolls off the surface at an angle less than 2°.

Figure 5:
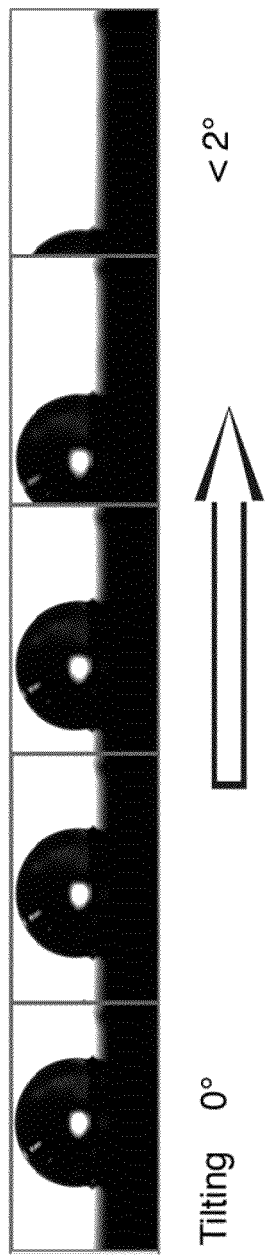
FIG. 5 is a series of photographs showing that a water droplet rolls off a surface with textured microposts sputtered with a rare earth oxide at a tilting angle of below 2°, according to an illustrative embodiment of the invention.

FIG. 5 shows a series of photographs demonstrating that a water droplet rolls off the surface described in FIG. 4a having nanograss-textured microposts sputtered with a rare earth oxide at a tilting angle of below 2°.

In certain embodiments, the liquid-impregnated surface is configured such that water droplets contacting the surface are not pinned or impaled on the surface.

As used herein, emerged area fraction $\phi$ is defined as a representative fraction of the projected surface area of the liquid-impregnated surface corresponding to non-submerged solid at equilibrium. The term "equilibrium" as used herein refers to the condition in which the average thickness of the impregnating film does not change over time due to drainage by gravity when the substrate is held away from horizontal, and where evaporation is negligible (e.g., if the liquid impregnated liquid were to be placed in an environment saturated with the vapor of that impregnated liquid). Similarly, the term "pseudo-equilibrium" as used herein refers to the same condition except that evaporation may occur.

In general, a "representative fraction" of a surface refers to a portion of the surface with a sufficient number of solid features thereupon such that the portion is reasonably representative of the whole surface. In certain embodiments, a "representative fraction" is at least a tenth of the whole surface.

Figure 6:
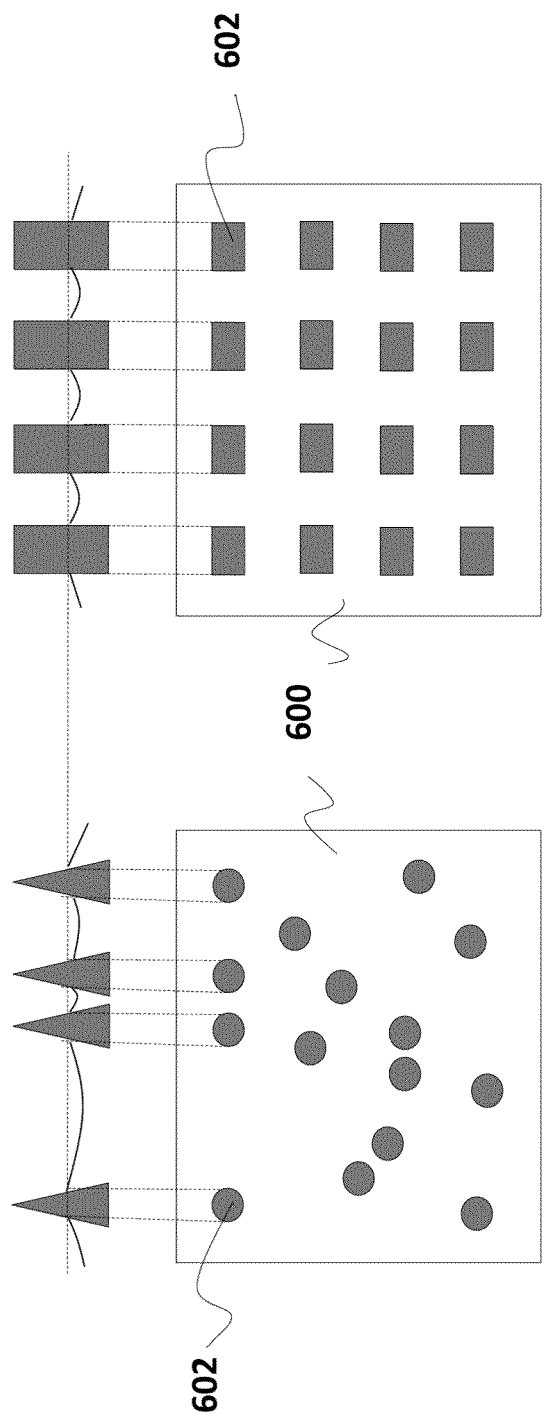
FIG. 6 illustrates a schematic cross-sectional and corresponding top view of a liquid-impregnated surface that are partially submerged.

Referring to FIG. 6, a schematic cross-sectional view and the corresponding top view of a liquid-impregnated surface that is partially submerged is shown. The upper left drawing of FIG. 6 shows a cross-sectional view of a row of cone-shaped solid features. The projected surface area of the non-submerged solid 602 is illustrated as shaded areas of the overhead view, while the remaining non-shaded area represents the projected surface area of the submerged liquid-impregnated surface 600. In addition to the projection surface area of this row of solid features, other solid features placed in a semi-random pattern are shown in shade in the overhead view. Similarly, the cross-section view of a row of evenly spaced posts is shown on the right of FIG. 6. Additional rows of well-patterned posts are shown in shade in the overhead view. As demonstrated, in some embodiments of the present invention, a liquid-impregnated surface includes randomly and/or non-randomly patterned solid features.

In certain embodiments of the present invention, $\phi$ is less than 0.30, 0.25, 0.20, 0.15, 0.10, 0.05, 0.01, or 0.005. In certain embodiments, $\phi$ is greater than 0.001, 0.005, 0.01, 0.05, 0.10, 0.15, or 0.20. In certain embodiments, $\phi$ is in a range of about 0 and about 0.25. In certain embodiments, $\phi$ is in a range of about 0 and about 0.01. In certain embodiments, $\phi$ is in a range of about 0.001 and about 0.25. In certain embodiments, $\phi$ is in a range of about 0.001 and about 0.10.

In certain embodiments, the liquid-impregnated surface is configured such that cloaking by the impregnating liquid can be either eliminated or induced, according to different embodiments described herein.

As used herein, the spreading coefficient, $S_{ow(a)}$ is defined as $\gamma_{wa}-\gamma_{wo}-\gamma_{oa}$, where $\gamma$ is the interfacial tension between the two phases designated by subscripts w, a, and o, where w is water, a is air, and o is the impregnating liquid. Interfacial tension can be measured using a pendant drop method as described in Stauffer, C. E., "The measurement of surface tension by the pendant drop technique," *J. Phys. Chem.* 1965, 69, 1933-1938, the text of which is incorporated by reference herein.

Without wishing to be bound to any particular theory, impregnating liquids that have $S_{ow(a)}$ less than 0 will not cloak, resulting in no loss of impregnating liquids, whereas impregnating liquids that have $S_{ow(a)}$ greater than 0 will cloak matter (condensed water droplets, bacterial colonies, solid surface) and this may be exploited to prevent corrosion, fouling, etc. In certain embodiments, cloaking is used for preventing vapor-liquid transformation (e.g, water vapor, metallic vapor, etc.). In certain embodiments, cloaking is used for inhibiting liquid-solid formation (e.g., ice, metal, etc.). In certain embodiments, cloaking is used to make reservoirs for carrying the materials, such that independent cloaked materials can be controlled and directed by external means (like electric or magnetic fields).

In certain embodiments, lubricant cloaking is desirable and is used a means for preventing environmental contamination, like a time capsule preserving the contents of the cloaked material. Cloaking can result in encasing of the material thereby cutting its access from the environment. This can be used for transporting materials (such as bioassays) across a length in a way that the material is not contaminated by the environment.

In certain embodiments, the amount of cloaking can be controlled by various lubricant properties such as viscosity, surface tension. Additionally or alternatively, we can control the de-wetting of the cloaked material to release the material.

Thus, it is contemplated that a system in which a liquid is dispensed in the lubricating medium at one end, and upon reaching the other end is exposed to environment that causes the lubricant to uncloak.

In certain embodiments, an impregnating liquid is or comprises an ionic liquid. In some embodiments, an impregnating liquid can be selected to have a $S_{ow(a)}$ less than 0. Exemplary impregnating liquids include, but are not limited to, tetrachloroethylene (perchloroethylene), phenyl isothiocyanate (phenyl mustard oil), bromobenzene, iodobenzene, o-bromotoluene, alpha-chloronaphthalene, alpha-bromonaphthalene, acetylene tetrabromide, 1-butyl-3-methylimidazolium bis (trifluoromethylsulfonyl) imide (BMIm), tribromohydrin (1,2,3-tribromopropane), ethylene dibromide, carbon disulfide, bromoform, methylene iodide (diiodomethane), stanolax, Squibb's liquid petrolatum, p-bromotoluene, monobromobenzene, perchloroethylene, carbon disulfide, phenyl mustard oil, monoiodobenzene, alpha-monochloro-naphthalene, acetylene tetrabromide, aniline, butyl alcohol, isoamyl alcohol, n-heptyl alcohol, cresol, oleic acid, linoleic acid, amyl phthalate and any combination thereof.

Figure 7:
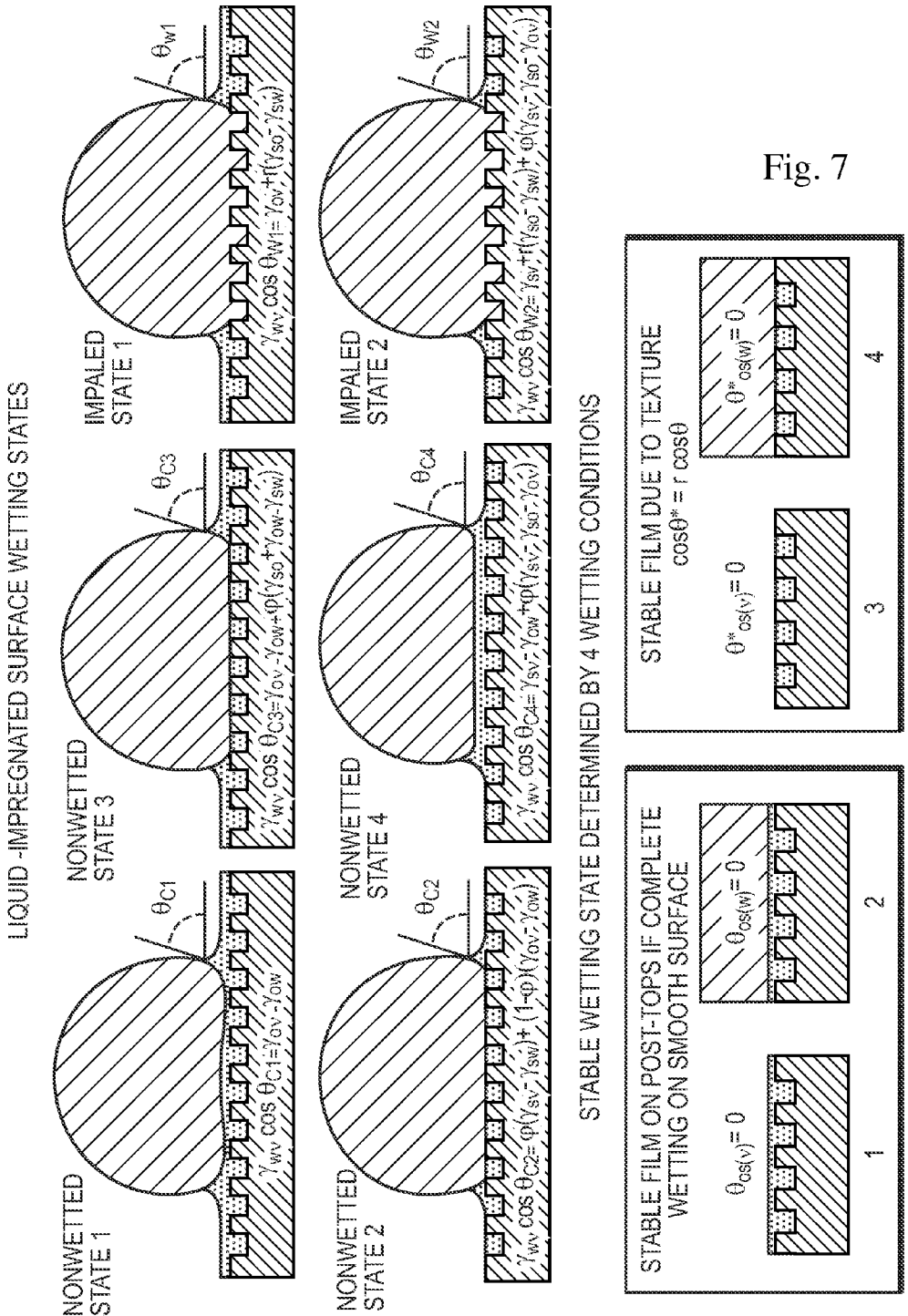
FIG. 7 is a schematic describing six liquid-impregnated surface wetting states, in accordance with certain embodiments of the invention.

FIG. 7 is a schematic describing six liquid-impregnated surface wetting states, in accordance with certain embodiments of the invention. The six surface wetting states (state 1 through state 6) depends on the four wetting conditions shown at the bottom of FIG. 7 (conditions 1 to 4). In most embodiments, the non-wetted states are preferred (states 1 to 4). Additionally, where a thin film stably forms on the tops of the posts (or other features on the surface), as in non-wetted states 1 and 3, even more preferable non-wetting properties (and other related properties described herein) may be observed.

In FIG. 7, Gamma_wv is the surface energy of the non-wetted phase in equilibrium with vapor; Gamma_ow is the interfacial energy between the non-wetted phase and the impregnated liquid; Gamma_ov is the surface energy of the impregnated liquid phase in equilibrium with vapor; Gamma_sv is the surface energy of the solid in equilibrium with vapor; Gamma_so is the interfacial energy between the impregnated phase and the solid; Gamma_sw is the interfacial energy between the solid and the non-wetted phase; r=total surface area divided by projected surface area; Theta_c1, Theta_c2, theta_c3, theta_c4, theta_w1, theta_w2, are the macroscopic contact angles made by the non-wetted phase in each wetting state; Theta*_os(v) is the macroscopic contact angle of oil on the textured substrate when the phase surrounding the textured substrate is vapor; Theta_os(v) is the contact angle of oil on a smooth solid substrate of the same chemistry when the phase surrounding the oil droplet is vapor; Theta*_os(w) is the macroscopic contact angle of oil on the textured substrate when the phase surrounding the oil droplet is water; and theta_os(w) is the contact angle of oil on a smooth substrate of the same chemistry as the textured surface when the phase surrounding the oil droplet is water.

FIG. 8 is a schematic showing conditions for the six liquid-impregnated surface wetting states shown in FIG. 7, in accordance with certain embodiments of the invention.

This amendment to the Specification is in full compliance with 37 CFR 1.57. The material being inserted is the material previously incorporated by reference. The amendment contains no new matter.

EQUIVALENTS

While the invention has been particularly shown and described with reference to specific preferred embodiments, it should be understood by those skilled in the art that various changes in form and detail may be made therein without departing from the spirit and scope of the invention as defined by the appended claims.

What is claimed is:

1. An article comprising a liquid-impregnated surface, said surface comprising a matrix of solid features spaced sufficiently close to stably contain an impregnating liquid therebetween and/or therewithin, wherein the surface comprises a rare earth element material, and wherein the article includes the impregnating liquid between and/or within the matrix of solid features, the surface coming into contact with a first substance different from the impregnating liquid, wherein $0<\phi<0.5$, where $\phi$ is the surface area fraction of said surface corresponding to non-submerged solid at equilibrium, and wherein said surface is a textured surface and said solid features are engineered protrusions of said textured surface.

2. The article of claim 1, wherein the impregnating liquid is stably contained between or within the matrix of features at equilibrium, the stably-contained liquid being a separate phase from the first substance in contact with the surface, the first substance being repelled by the surface.

3. The article of claim 1, wherein the textured surface is coated (e.g., partially or completely) with a second substance comprising the rare-earth element material.

4. The article of claim 1, wherein the rare earth element material comprises at least one member selected from the group consisting of a rare earth oxide, a rare earth carbide, a rare earth nitride, a rare earth fluoride, and a rare earth boride.

5. The article of claim 1, wherein the rare earth element material comprises at least one member selected from the group consisting of scandium oxide ($Sc_2O_3$), yttrium oxide ($Y_2O_3$), lanthanum oxide ($La_2O_3$), cerium oxide ($CeO_2$), praseodymium oxide ($Pr_6O_{11}$), neodymium oxide ($Nd_2O_3$), samarium oxide ($Sm_2O_3$), europium oxide ($Eu_2O_3$), gadolinium oxide ($Gd_2O_3$), terbium oxide ($Tb_4O_7$), dysprosium oxide ($Dy_2O_3$), holmium oxide ($Ho_2O_3$), erbium oxide ($Er_2O_3$), thulium oxide ($Tm_2O_3$), ytterbium oxide ($Yb_2O_3$), lutetium oxide ($Lu_2O_3$), cerium carbide ($CeC_2$), praseodymium carbide ($PrC_2$), neodymium carbide ($NdC_2$), samarium carbide ($SmC_2$), europium carbide ($EuC_2$), gadolinium carbide ($GdC_2$), terbium carbide ($TbC_2$), dysprosium carbide ($DyC_2$), holmium carbide ($HoC_2$), erbium carbide ($ErC_2$), thulium carbide ($TmC_2$), ytterbium carbide ($YbC_2$), lutetium carbide ($LuC_2$), cerium nitride (CeN), praseodymium nitride (PrN), neodymium nitride (NdN), samarium nitride (SmN), europium nitride (EuN), gadolinium nitride (GdN), terbium nitride (TbN), dysprosium nitride (DyN), holmium nitride (HoN), erbium nitride (ErN), thulium nitride (TmN), ytterbium nitride (YbN), lutetium nitride (LuN), cerium fluoride ($CeF_3$), praseodymium fluoride ($PrF_3$), neodymium fluoride ($NdF_3$), samarium fluoride ($SmF_3$), europium fluoride ($EuF_3$), gadolinium fluoride ($GdF_3$), terbium fluoride ($TbF_3$), dysprosium fluoride ($DyF_3$), holmium fluoride ($HoF_3$), erbium fluoride ($ErF_3$), thulium fluoride ($TmF_3$), ytterbium fluoride ($YbF_3$), and lutetium fluoride ($LuF_3$).

6. The article of claim 1, wherein the surface is impregnated with one or more members selected from the group consisting of silicone oil, a perfluorocarbon liquid, a fluorinated coolant, an ionic liquid, a fluorinated ionic liquid, a silicone oil comprising PDMS, a fluorinated silicone oil, a liquid metal, an electro-rheological fluid, a magneto-rheological fluid, a ferrofluid, a dielectric liquid, a hydrocarbon liquid, a fluorocarbon liquid, a refrigerant, a vacuum oil, a phase-change material, a semi-liquid, grease, synovial fluid, and a bodily fluid.

7. The article of claim 1, wherein the liquid-impregnated surface is transparent or translucent.

8. The article of claim 1, wherein the solid features comprise one or more particles, nanoneedles, nanograss, or posts.

9. The article of claim 8, wherein the solid features are randomly spaced.

10. The article of claim 1, wherein $0<\phi<0.25$, where $\phi$ is the surface area fraction of said surface corresponding to non-submerged solid at equilibrium, and wherein said surface is a textured surface and said solid features are engineered protrusions of said textured surface.

11. The article of claim 1, wherein a contact angle of the impregnating liquid with the first substance on the surface comprising the matrix of solid features is equal to zero, and
wherein a contact angle of the impregnating liquid with the first substance on a smooth surface is greater than zero.

12. The article of claim 1, wherein the article includes a coating comprising the rare earth element material, the article further comprising an adhesion layer disposed between the coating and the surface comprising the matrix of solid features.

13. The article of claim 12, wherein the adhesion layer comprises at least one material selected from the list consisting of a metal, an intermetallic, an alloy, and/or a ceramic.

14. A method of using an article of claim 1 to repel an external substance from the surface of the article, wherein the external substance has a different composition than the stably-contained liquid.

15. An article comprising a liquid-impregnated surface, said surface comprising: a base substrate comprising a matrix of solid features coated with a hydrophobic coating, the hydrophobic coating comprising a rare earth element material, wherein the hydrophobic coating is transparent or translucent, wherein the coated matrix of solid features is spaced sufficiently close to stably contain an impregnating liquid therebetween and/or therewithin, and wherein the article includes the impregnating liquid between and/or within the coated matrix of solid features, the surface coming into contact with a first substance different from the impregnating liquid,
wherein a contact angle of the impregnating liquid with the first substance on the surface comprising the matrix of solid features is equal to zero, and
wherein a contact angle of the impregnating liquid with the first substance on a smooth surface is greater than zero.

16. The article of claim 15, wherein an exposed surface of the hydrophobic coating has a dynamic contact angle with water of at least about 90 degrees.

17. The article of claim 15, further comprising an adhesion layer disposed between the hydrophobic coating and the surface comprising the matrix of solid features.

18. An article comprising a liquid-impregnated surface, said surface comprising a plurality of micro-scale and/or nano-scale solid features spaced sufficiently close to stably contain an impregnating liquid therebetween, said surface stably containing said impregnating liquid between said solid features, wherein said impregnating liquid fills a volume between said solid features, wherein the surface comprises a rare earth element material, the surface coming into contact with a first substance different from the impregnating liquid,
wherein a contact angle of the impregnating liquid with the first substance on the surface comprising the matrix of solid features is equal to zero, and
wherein a contact angle of the impregnating liquid with the first substance on a smooth surface is equal to zero.

19. The article of claim 18, wherein the solid features comprise one or more particles, nanoneedles, nanograss, or posts.

20. The article of claim 19, wherein the solid features are randomly spaced.

21. The article of claim 18, wherein the article includes a coating comprising the rare earth element material, the article further comprising an adhesion layer disposed between the coating and the surface comprising the matrix of solid features.

* * * * *